(12) United States Patent  
Kang et al.

(10) Patent No.: US 8,948,019 B2  
(45) Date of Patent: Feb. 3, 2015

(54) SYSTEM AND METHOD FOR PREVENTING INTRUSION OF ABNORMAL GTP PACKET

(75) Inventors: Dong Wan Kang, Seoul (KR); Joo Hyung Oh, Seoul (KR); Se Kwon Kim, Seoul (KR); Jung Sik Cho, Seoul (KR); Chae Tae Im, Seoul (KR)

(73) Assignee: Korea Internet & Security Agency, Seoul (KR)

( * ) Notice: Subject to any disclaimer, the term of this patent is extended or adjusted under 35 U.S.C. 154(b) by 270 days.

(21) Appl. No.: 13/549,273

(22) Filed: Jul. 13, 2012

(65) Prior Publication Data

US 2013/0148510 A1    Jun. 13, 2013

(30) Foreign Application Priority Data

Dec. 12, 2011   (KR) .................. 10-2011-0132974  
May 7, 2012    (KR) .................. 10-2012-0048106

(51) Int. Cl.  
*G06F 11/00*   (2006.01)

(52) U.S. Cl.  
USPC .............................. 370/241; 370/230; 726/22

(58) Field of Classification Search  
USPC ......... 370/218, 230, 328, 352, 389, 390, 392, 370/395.41, 395.52, 516, 536, 241; 726/2, 726/3, 4, 5, 6, 11–15, 21, 22–33  
See application file for complete search history.

(56) References Cited

U.S. PATENT DOCUMENTS

| | | | |
|---|---|---|---|
| 2006/0075481 | A1 | 4/2006 | Ross et al. |
| 2006/0206933 | A1 | 9/2006 | Molen et al. |
| 2009/0172818 | A1* | 7/2009 | Sutherland et al. ............. 726/25 |
| 2011/0069663 | A1* | 3/2011 | Shu et al. ...................... 370/328 |

FOREIGN PATENT DOCUMENTS

| | | |
|---|---|---|
| KR | 10-2006-0118830 A | 11/2006 |
| KR | 1020080057161 A | 6/2008 |
| KR | 10-2009-0030642 A | 3/2009 |
| KR | 1020100030900 | 3/2010 |
| KR | 101125817 B1 | 3/2012 |

OTHER PUBLICATIONS

Xuena Peng, GTP Security in 3G Core Network, 2010, IEEE, pp. 15-19.*

(Continued)

*Primary Examiner* — Michael Thier  
*Assistant Examiner* — Prince A Mensah  
(74) *Attorney, Agent, or Firm* — Holland & Knight LLP; Brian J. Colandreo, Esq.; Jeffrey T. Placker, Esq.

(57) ABSTRACT

Provided are a system and method for preventing the intrusion of an abnormal GPRS tunneling protocol (GTP) packet. The system includes: a system management unit including a monitoring unit which monitors a state of the system and a mode changing unit which changes an operation mode of the system based on the state of the system; a packet capture unit including a packet management unit which stores information about a GTP packet based on the operation mode of the system and a detection result checking unit which determines whether to drop the GTP packet; and a packet detection unit including a packet parsing unit which parses the information about the GTP packet and a packet analysis unit which analyzes the parsed information about the GTP packet, wherein the operation mode of the system is an intrusion prevention system (IPS) mode or a bypass mode.

18 Claims, 19 Drawing Sheets

(56) References Cited

OTHER PUBLICATIONS

Universal Mobile Telecommunications System (UMTS); GPRS Tunnelling Protocol for User Plane (GTPv1-U) (3GPP TS 29.281 version 8.0.0 Release 8), 2011, pp. 1-25.*
Korean Notice of Allowance issued on Nov. 18, 2013 for corresponding KR Patent Application No. 10-2012-0048106.
Korean Office Action for Korean Patent Application No. 10-2011-0132974, mailed Feb. 20, 2012, 3 pages.
Notice of Allowance for Korean Patent Application No. 10-2011-0132974, mailed Mar. 29, 2012, 5 pages.
Office Action issued by the KIPO for Korean patent application No. 10-2012-0048106. 4 pages.
English abstract of KR101125817. 1 page.

* cited by examiner

FIG. 11

| Rule ID | Rule Type | DETAILED CRITERIA | | Policy | Active |
|---|---|---|---|---|---|
| | | INTERNAL IP (IP PACKET) | GTP Port (GTP-U/GTP-C) | | |
| A1 | PDP Create Req | O | O | Bypass/Drop | 1/0 |
| A2 | | O | X | Bypass/Drop | 1/0 |
| A3 | | X | O | Bypass/Drop | 1/0 |
| A4 | | X | X | Bypass/Drop | 1/0 |
| B1 | PDP Update Req | O | O | Bypass/Drop | 1/0 |
| B2 | | O | X | Bypass/Drop | 1/0 |
| B3 | | X | O | Bypass/Drop | 1/0 |
| B4 | | X | X | Bypass/Drop | 1/0 |
| C1 | PDP Delete Req | O | O | Bypass/Drop | 1/0 |
| C2 | | O | X | Bypass/Drop | 1/0 |
| C3 | | X | O | Bypass/Drop | 1/0 |
| C4 | | X | X | Bypass/Drop | 1/0 |
| D1 | GTP Echo Req | O | O | Bypass/Drop | 1/0 |
| D2 | | O | X | Bypass/Drop | 1/0 |
| D3 | | X | O | Bypass/Drop | 1/0 |
| D4 | | X | X | Bypass/Drop | 1/0 |
| E1 | GTP-U | O | O | Bypass/Drop | 1/0 |
| E2 | | O | X | Bypass/Drop | 1/0 |
| E3 | | X | O | Bypass/Drop | 1/0 |
| E4 | | X | X | Bypass/Drop | 1/0 |

SYSTEM AND METHOD FOR PREVENTING INTRUSION OF ABNORMAL GTP PACKET

This application claims priority from Korean Patent Application No. 10-2011-0132974 filed on Dec. 12, 2011, and Korean Patent Application No. 10-2012-0048106 filed on May 7, 2012 in the Korean Intellectual Property Office, the disclosures of which are incorporated herein by reference in their entirety.

BACKGROUND OF THE INVENTION

1. Field of the Invention

The present invention relates to a system and method for preventing the intrusion of an abnormal GPRS tunneling protocol (GTP) packet, and more particularly, to a system and method for preventing the intrusion of an abnormal GTP packet, in which the intrusion of an abnormally generated GTP packet can be detected and blocked.

2. Description of the Related Art

With the surge in smart phone users and the increased availability of various mobile services, a mobile communication network such as a third-generation code division multiple access (3G WCDMA) network is evolving from a closed service structure to an open service structure.

GPRS tunneling protocol (GTP) is a protocol used within mobile communication networks, in particular, mobile Internet networks such as 3G, LTE and 4G. GTP is classified into a GTP-C packet used for signalling between a serving GPRS support node (SGSN) and a gateway GPRS support node (GGSN) and a GTP-U packet used for data transmission between the SGSN and the GGSN. GTP was designed for signaling and data transfer, e.g., for setting up a data call to provide a data service to user equipment (such as a smart phone). In addition, GTP was designed for use within mobile communication networks. However, GTP was designed without consideration of user authentication, fake and falsified traffic detection, and the like.

Therefore, when user equipment fraudulently transmits a GTP packet, an abnormal GTP packet in the form of GTP-in-GTP or GTP-over-GTP can be generated within a mobile communication network.

SUMMARY OF THE INVENTION

Aspects of the present invention provide a system and method for preventing the intrusion of an abnormal GPRS tunneling protocol (GTP) packet, the system and method employed to prepare for a possible failure caused by the intrusion of an abnormal GTP packet into a system.

Aspects of the present invention also provide a system and method for preventing the intrusion of an abnormal GTP packet, the system and method employed to efficiently detect an abnormal GTP packet which can cause abnormal data call set up, forced termination of normal data call set up, a billing attack, and the like.

Aspects of the present invention also provide a system and method for preventing the intrusion of an abnormal GTP packet, the system and method employed to efficiently detect an abnormal GTP packet based on a length of a GTP-U packet and a payload of the GTP-U packet.

Aspects of the present invention also provide a system and method for preventing the intrusion of an abnormal GTP packet, the system and method employed to detect abnormal GTP packets more accurately by reducing a detection error rate in the process of detecting abnormal GTP packets.

Aspects of the present invention also provide a system and method for preventing the intrusion of an abnormal GTP packet, the system and method employed to efficiently process an abnormal GTP packet when the abnormal GTP packet is detected.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a system for preventing the intrusion of an abnormal GTP packet. The system includes: a system management unit including a monitoring unit which monitors a state of the system and a mode changing unit which changes an operation mode of the system based on the state of the system; a packet capture unit including a packet management unit which stores information about a GTP packet based on the operation mode of the system and a detection result checking unit which determines whether to drop the GTP packet; and a packet detection unit including a packet parsing unit which parses the information about the GTP packet and a packet analysis unit which analyzes the parsed information about the GTP packet, wherein the operation mode of the system is an intrusion prevention system (IPS) mode or a bypass mode.

According to another aspect of the present invention, there is provided a method of preventing the intrusion of an abnormal GTP packet. The method includes: monitoring a state of a system for preventing the intrusion of an abnormal GTP packet; changing an operation mode of the system based on the state of the system; storing information about a GTP packet based on the operation mode of the system; parsing the information about the GTP packet; analyzing the parsed information about the GTP packet; and determining whether to drop the GTP packet, wherein the operation mode of the system is an IPS mode or a bypass mode.

BRIEF DESCRIPTION OF THE DRAWINGS

The above and other aspects and features of the present invention will become more apparent by describing in detail exemplary embodiments thereof with reference to the attached drawings, in which:

FIG. 11 is a table of detection policies according to an embodiment of the present invention;

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The present invention will now be described more fully with reference to the accompanying drawings, in which exemplary embodiments of the invention are shown.

Figure 1:
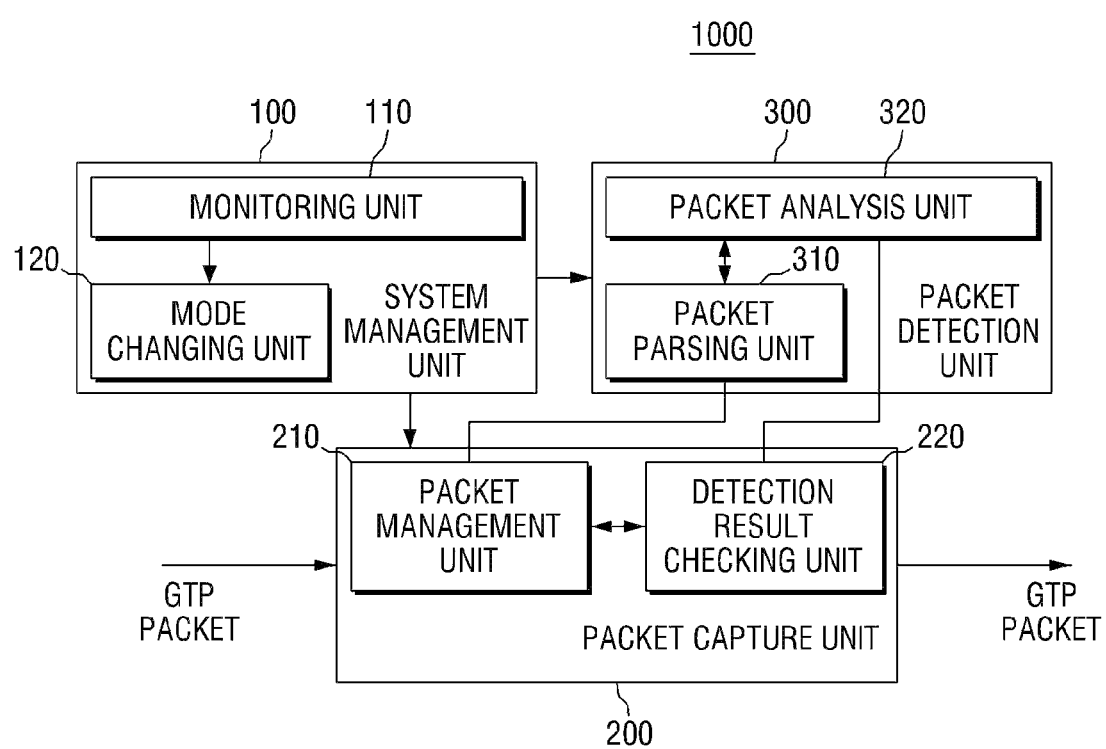
FIGS. 1 and 2 are schematic diagrams of systems for preventing the intrusion of an abnormal GPRS tunneling protocol (GTP) packet according to various embodiments of the present invention.
Figure 2:
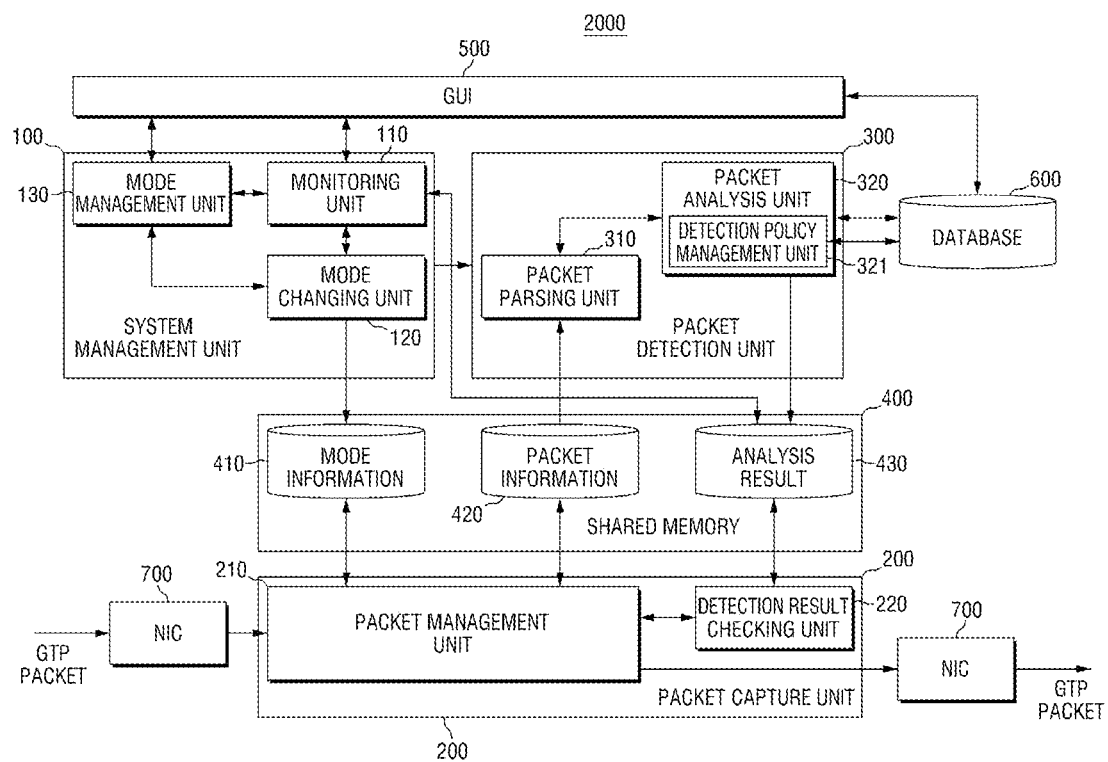
Figure 3:
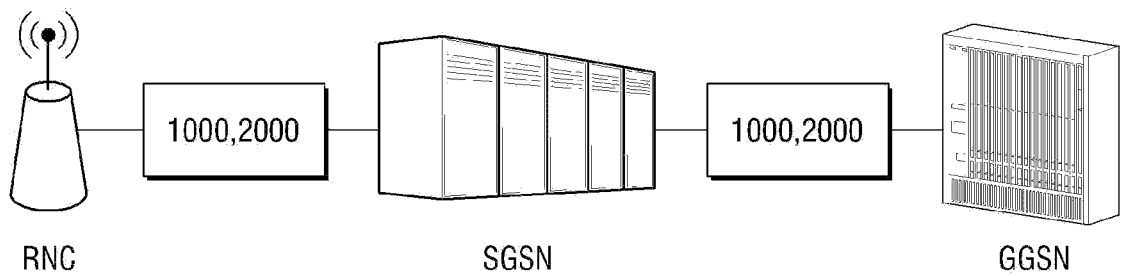
FIG. 3 is a schematic diagram of a mobile communication system which includes one of the systems for preventing the intrusion of an abnormal GTP packet shown in FIGS. 1 and 2.

FIGS. 1 and 2 are schematic diagrams of systems 1000 and 2000 for preventing the intrusion of an abnormal GPRS tunneling protocol (GTP) packet according to various embodiments of the present invention. FIG. 3 is a schematic diagram of a mobile communication system which includes one of the systems 1000 and 2000 for preventing the intrusion of an abnormal GTP packet shown in FIGS. 1 and 2. Referring to FIG. 1, the system 1000 for preventing the intrusion of an abnormal GTP packet may include a system management unit 100, a packet capture unit 200, and a packet detection unit 300. Referring to FIG. 2, the system 2000 for preventing the intrusion of an abnormal GTP packet may further include a shared memory 400, a graphical user interface (GUI) 500, a database 600, and network interface cards (NICs) 700.

A GTP packet is classified into a GTP-C packet used for signalling between a serving GPRS support node (SGSN) and a gateway GPRS support node (GGSN) and a GTP-U packet used for data transmission between the SGSN and the GGSN. The GTP-C packet is used to set, delete, and update a data call between an SGSN and a GGSN within a mobile Internet network such as 3G/LTE/4G. When user equipment (such as a smart phone) requests a data service, the GTP-C packet occurs between the SGSN and the GGSN. The GTP-U packet is used to carry user data between an SGSN and a GGSN within a mobile Internet network such as 3G/LTE/4G.

GTP-in-GTP refers to a case where a data call setting message is transmitted by setting up a normally connected data call (that is, a case where a GTP-C packet is encapsulated in a GTP-U packet and transmitted accordingly), a case where a GGSN processes a GTP-C packet encapsulated in a GTP-U packet as a normal data call setting request (?), or a case where a GTP-U packet is encapsulated in another GTP-U packet and transmitted accordingly. GTP-in-GTP can also be referred to as GTP-over-GTP. For ease of description, GTP-in-GTP and GTP-over-GTP will collectively be referred to as abnormal GTP packets in the present specification.

In the present specification, operation modes of a system include an intrusion prevention system (IPS) mode and a bypass mode. In the IPS mode, the system analyzes an abnormal GTP packet and controls the abnormal GTP packet based on the analysis result. In the bypass mode, the system transmits all input GTP packets without filtering them.

As described above, GTP-C packets and GTP-U packets can be used between a radio network controller (RNC) and an SGSN and between the SGSN and a GGSN within a mobile Internet network such as 3G/LT/4G. Therefore, the systems 1000 and 2000 for preventing the intrusion of an abnormal GTP packet according to the embodiments of the present invention can be placed between the RNC and the SGSN and between the SGSN and the GGSN, as shown in FIG. 3.

In FIG. 3, the system 1000 or 2000 for preventing the intrusion of an abnormal GTP packet is located between the RNC and the SGSN and between the SGSN and the GGSN, that is, located at a Gn interface. However, the system 1000 or 2000 can also be located in various network sections in which GTP packets are communicated. That is, the system 1000 or 2000 can be placed in a network section, in which GTP packets are communicated, to receive a GTP packet, analyze the GTP packet, and determine whether to drop the GTP packet based on the analysis result.

In addition, the system 1000 or 2000 may be connected to the SGSN or the GGSN. Specifically, the system 1000 or 2000 may be connected to the SGSN or the GGSN to receive a GTP packet, analyze the GTP packet, and determine whether to drop the GTP packet based on the analysis result. For simplicity, only the SGSN and the GGSN are illustrated in FIG. 3 as elements of the mobile communication system. However, the mobile communication system can include various elements other than the SGSN and the GGSN, and the system 1000 or 2000 can connect to all elements which communicate GTP packets among the various elements and perform a GTP packet intrusion prevention algorithm.

The system 1000 or 2000 can also be placed within the SGSN and/or the GGSN. That is, the system 1000 or 2000 can be placed within the SGSN and/or the GGSN to perform a GTP packet intrusion prevention algorithm. For simplicity, only the SGSN and the GGSN are illustrated in FIG. 3 as elements of the mobile communication system. However, the mobile communication system can include various elements other than the SGSN and the GGSN, and the system 1000 or 2000 can be placed within all elements which communicate GTP packets among the various elements and perform a GTP packet intrusion prevention algorithm.

Referring to FIG. 1, the system management unit 100 may include a monitoring unit 110 which monitors the state of the system 1000 for preventing the intrusion of an abnormal GTP packet and a mode changing unit 120 which changes the operation mode of the system 1000 based on the state of the system 1000. In addition, referring to FIG. 2, the system management unit 100 may further include a mode management unit 130 which identifies from the GUI 500 whether the operation mode of the system 2000 has been changed.

The monitoring unit 110 determines whether the system 1000 or 2000 is in a failure state by monitoring the state of the system 1000 or 2000. When the system 1000 or 2000 is in the failure state, the operation mode of the system 1000 or 2000 may be changed. In some embodiments of the present invention, the monitoring unit 110 may monitor the state of the system 1000 or 2000 only when the system 1000 or 2000 operates in the IPS mode and, when determining that the system 1000 or 2000 is in the failure state based on the monitoring result, may request the mode changing unit 120 to change the operation mode of the system 1000 or 2000 to the bypass mode.

Referring to FIG. 1, when requested to change the operation mode of a system, the mode changing unit 120 may transmit information about the mode change of the system directly to the packet capture unit 200. However, when the system includes the shared memory 400 as shown in FIG. 2, the mode changing unit 120 may store the information about the mode change in the shared memory 400, and the packet capture unit 200 may access the shared memory 400 and obtain the information about the mode change of the system. The operation of the system management unit 100 will now be described in greater detail with reference to FIGS. 2 and 4 through 6.

Figure 4:
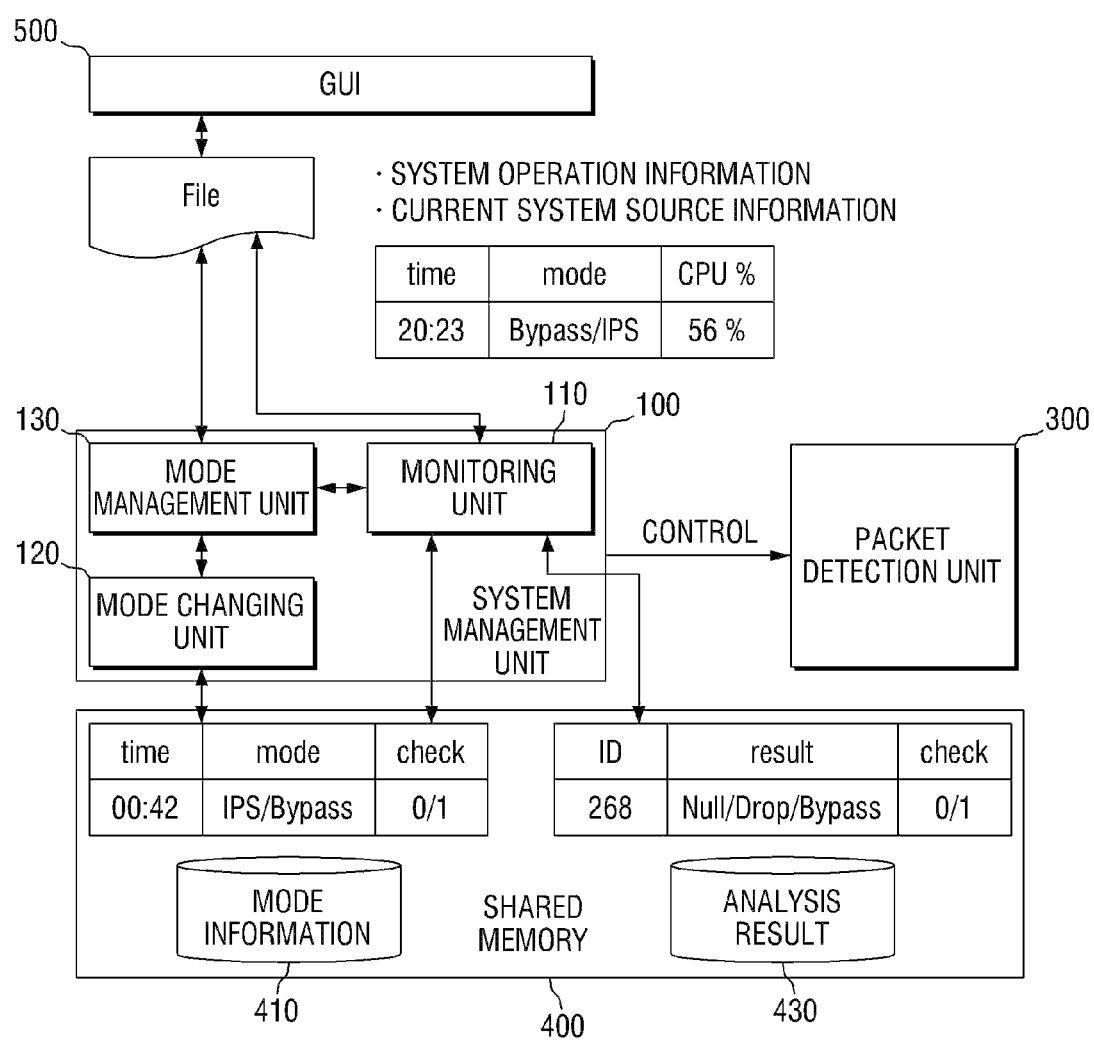
FIG. 4 is a schematic diagram illustrating the operation of a system management unit according to an embodiment of the present invention.
Figure 5:
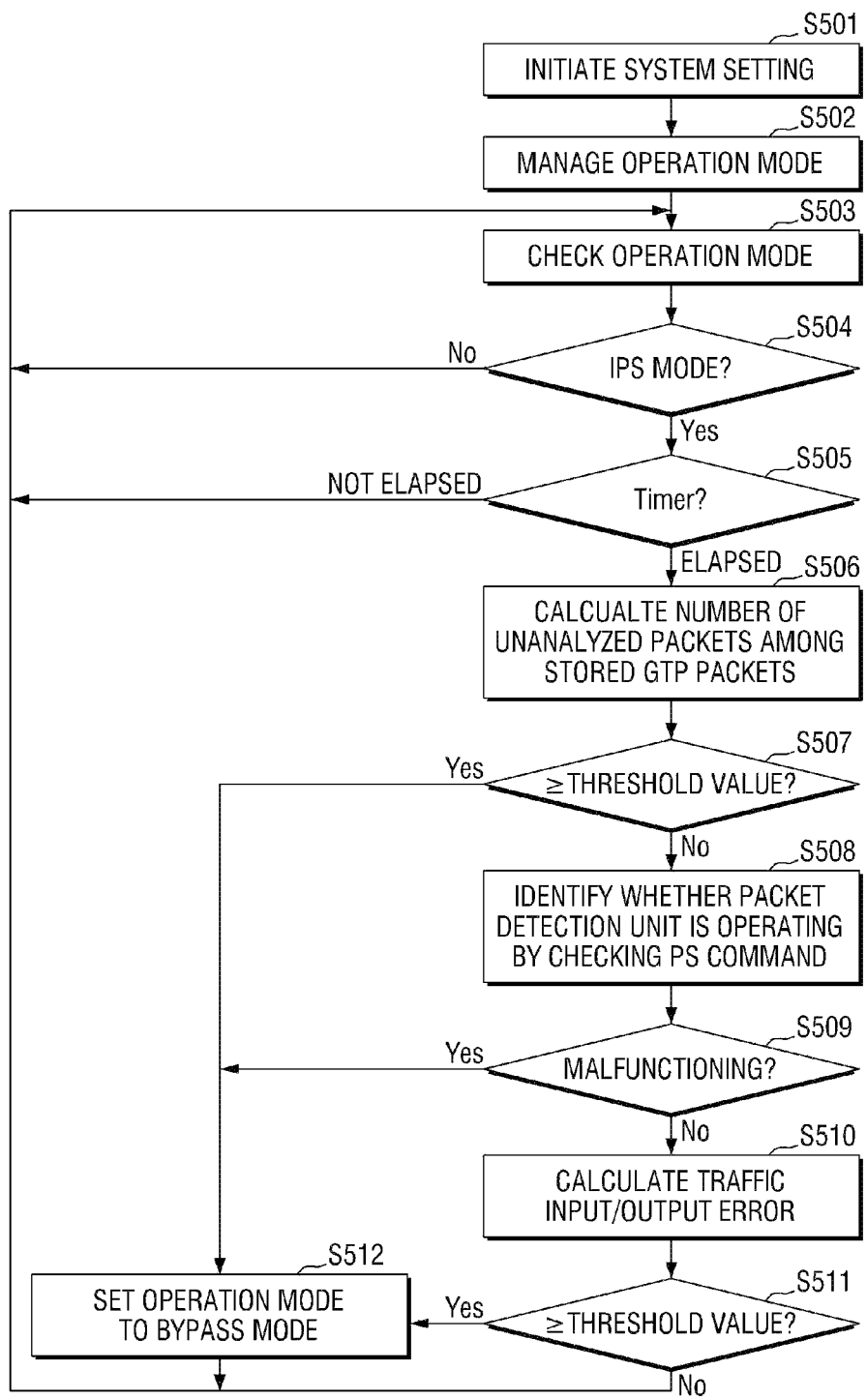
FIG. 5 is a flowchart illustrating the operation of the system management unit according to an embodiment of the present invention.
Figure 6:
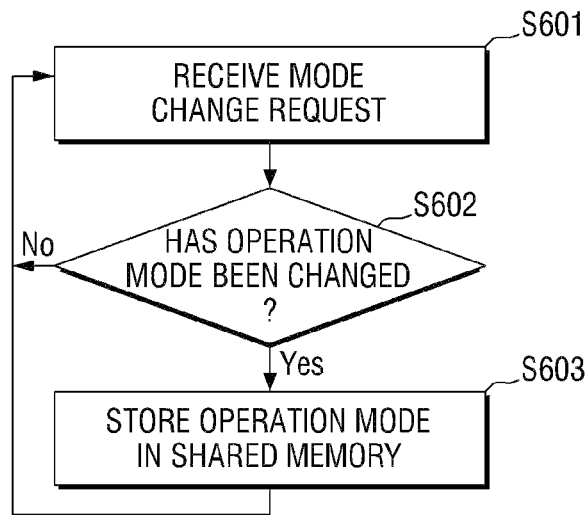
FIG. 6 is a flowchart illustrating the operation of a mode changing unit according to an embodiment of the present invention.

FIG. 4 is a schematic diagram illustrating the operation of the system management unit 100 according to an embodiment of the present invention. FIG. 5 is a flowchart illustrating the operation of the system management unit 100 according to an embodiment of the present invention. FIG. 6 is a flowchart illustrating the operation of the mode changing unit 120 according to an embodiment of the present invention.

Referring to FIG. 5, the system management unit 100 may initiate the settings of a system before starting the system (operation S501). To initiate the settings of the system, the system management unit 100 may set the shared memory 400, set the operation mode of the system to the bypass mode, and initiate a packet information storage area 420 and an analysis result storage area 430 within the shared memory 400.

Then, the system management unit 100 may manage an operation mode input from the GUI 500 (operation S502). As described above, the system 2000 for preventing the intrusion of an abnormal GTP packet may further include the GUI 500. Thus, a user or administrator can set the operation mode of the system using the GUI 500. When the user or administrator changes the operation mode of the system, the GUI 500 may transmit a mode change request to the mode management unit 130 and/or the monitoring unit 110 of the system management unit 100.

Referring to FIG. 6, the mode management unit 130 may receive information about whether the operation mode of the system has been changed, that is, a mode change request from the GUI 500 (operation S601) and determine whether the operation mode of the system has been changed (operation S602). When the operation mode of the system has been changed, the mode management unit 130 may store information about the mode change of the system in a mode information storage area 410 of the shared memory 400 directly or through the mode changing unit 120 (operation S603). For example, referring to FIG. 4, the time when the operation mode of the system was changed and the type of an operation mode to which the operation mode of the system was changed may be stored in the mode information storage area 410 of the shared memory 400. When the operation of the system is changed, a 'check' value may be set to zero. As will be described below, the check value may be set to one when the packet capture unit 200 checks whether the operation mode of the system has been changed.

For ease of description, the mode management unit 130 has been described as a separate element from the monitoring unit 110 and the mode changing unit 120. However, it is obvious that the mode management unit 130 can be integrated with the monitoring unit 110 or the mode changing unit 120.

Next, the system management unit 100 may check the operation mode of the system (operation S503) and determine whether the operation mode of the system is the IPS mode (operation S504). When the operation mode of the system is the bypass mode, the system transmits all input GTP packets without filtering them. In this case, there is no need to determine whether the system is in the failure state. Therefore, the system management unit 100 waits until the operation mode of the system is changed to the IPS mode.

When the operation mode of the system is the IPS mode, the system management unit 100 may determine whether a timer has elapsed (operation S505). Whether the system is in the failure state can be determined periodically using the timer.

The monitoring unit 110 of the system management unit 100 may determine whether the system is in the failure state by monitoring the state of the system.

Specifically, the monitoring unit 110 may check the analysis result storage area 430 of the shared memory 400 and calculate the number of GTP packets unanalyzed by a packet analysis unit 320 of the packet detection unit 300 among GTP packets stored by a packet management unit 210 of the packet capture unit 200 (operation S506). When the number of the unanalyzed GTP packets is equal to or greater than a threshold value (operation S507), the monitoring unit 110 may determine that the system is in the failure state and set the operation of the system to the bypass mode (operation S512).

The analysis result storage area 430 of the shared memory 400 may store a packet ID for identifying each GTP packet, an analysis result of each GTP packet, and a check value indicating whether the packet capture unit 200 has checked the analysis result. A GTP packet stored in the shared memory 400 by the packet management unit 210 of the packet capture unit 200 may be identified by a packet ID, and an analysis result of the GTP packet is initially recorded as Null. After the GTP packet is analyzed by the packet analysis unit 320 of the packet detection unit 300, the analysis result of the GTP packet is recorded as Drop or Bypass. The monitoring unit 110 may check this analysis result storage area 430 of the shared memory 400 and calculate the number of GTP packets unanalyzed by the packet analysis unit 320, that is, the number of GTP packets whose analysis result values are Null. When the calculated number of GTP packets is equal to or greater than a preset threshold value, the monitoring unit 110 may determine that the system is in the failure state and change the operation of the system to the bypass mode in order to prevent malfunctions caused by the failure of the system.

In FIG. 5, whether the system is in the failure state is determined based on whether the number of unanalyzed GTP packets is equal to or greater than a threshold value. However, in some embodiments of the present invention, whether the system is in the failure state may be determined based on whether the number of GTP packets unanalyzed for a predetermined period of time is equal to or greater than a threshold value or based on whether a ratio of the number of unanalyzed GTP packets to the total number of GTP packets is equal to or greater than a threshold ratio.

Next, the monitoring unit 110 identifies whether the packet detection unit 300 is operating by checking a process status (PS) command related to the operation of a processor (operation S508). When the packet detection unit 300 is malfunctioning (operation S509), the monitoring unit 110 may determine that the system is in the failure state and set the operation mode of the system to the bypass mode (operation S512).

The monitoring unit 110 may calculate a traffic input/output error of the system by checking inbound traffic and outbound traffic of the system (operation S510). When the traffic input/output error is equal to or greater than a threshold value (operation S511), the monitoring unit 110 may determine that the system is in the failure state and set the operation mode of the system to the bypass mode (operation S512).

The traffic input/output error may be a value obtained by subtracting the amount of outbound traffic and the number of GTP packets determined to be dropped by a detection result checking unit 220 from the amount of inbound traffic. Here, a GTP packet determined to be dropped refers to a GTP packet that is received by or input to the system but is not transmitted or output to another destination from the system. Therefore, the traffic input/output error denotes the amount of traffic currently being processed within the system. Thus, when the traffic input/output error is equal to or greater than a preset threshold value, the monitoring unit 110 may determine that the system is in the failure state and change the operation mode of the system to the bypass mode in order to prevent malfunctions caused by the failure of the system.

In FIG. 5, whether the system is in the failure state is determined based on whether the traffic input/output error is equal to or greater than a threshold value. However, in some embodiments of the present invention, whether the system is in the failure state may be determined based on whether the traffic input/output error for a predetermined period of time is equal to or greater than a threshold value or based on whether a ratio of the traffic input/output error to the total amount of inbound traffic is equal to or greater than a threshold ratio.

In FIG. 5, whether the system is in the failure state is determined in the order of operations S506, S508 and S510. However, the present invention is not limited to this order. It is obvious that the operations S506, S508 and S510 can also be performed in the reverse order or simultaneously.

Referring back to FIG. 1, the packet capture unit 200 may include the packet management unit 210 which stores information about a GTP packet based on the operation mode of the system and the detection result checking unit 220 which determines whether to drop the GTP packet. In addition, the packet capture unit 200 may include a receiving unit (not shown) which receives a GTP packet and a transmitting unit (not shown) which transmits a GTP packet. Referring to FIG. 2, the packet capture unit 200 may be connected to the NICs 700.

The receiving and transmitting units of the packet capture unit 200 may respectively be connected to the NICs 700 for processing high-volume packets at high speed to realize a device driver for packet processing at the kernel level. The receiving and transmitting units of the packet capture unit 200 can be connected to general NICs. In some embodiments, the receiving and transmitting units of the packet capture unit 200 can be connected to hardware accelerated NICs to process high-volume packets. In the present specification, these various NICs are generalized as NICs.

The packet management unit 210 may store information about a GTP packet based on the operation mode of the system. That is, when the operation mode of the system is the bypass mode, the packet management unit 210 may transmit a GTP packet received by the system. When the operation mode of the system is the IPS mode, the packet management unit 210 may store the received GTP packet. Referring to FIG. 1, the packet management unit 210 may store a received GTP packet and transmit the GTP packet to the packet detection unit 300. Alternatively, referring to FIG. 2, information about the GTP packet may be stored in the shared memory 400, and the packet detection unit 300 may access the shared memory 400 and obtain the information about the GTP packet.

The detection result checking unit 220 may determine whether to drop a GTP packet based on an analysis result of the GTP packet received from the packet detection unit 300 and transmit the determination result to the packet management unit 210. Referring to FIG. 1, the detection result checking unit 220 may receive the analysis result of the GTP packet directly from the packet detection unit 300. Alternatively, referring to FIG. 2, the detection result checking unit 220 may receive the analysis result of the GTP packet through the shared memory 400. The operation of the packet capture unit 200 which includes the packet management unit 210 and the detection result checking unit 220 will now be described in greater detail with reference to FIGS. 7 and 8.

Figure 7:
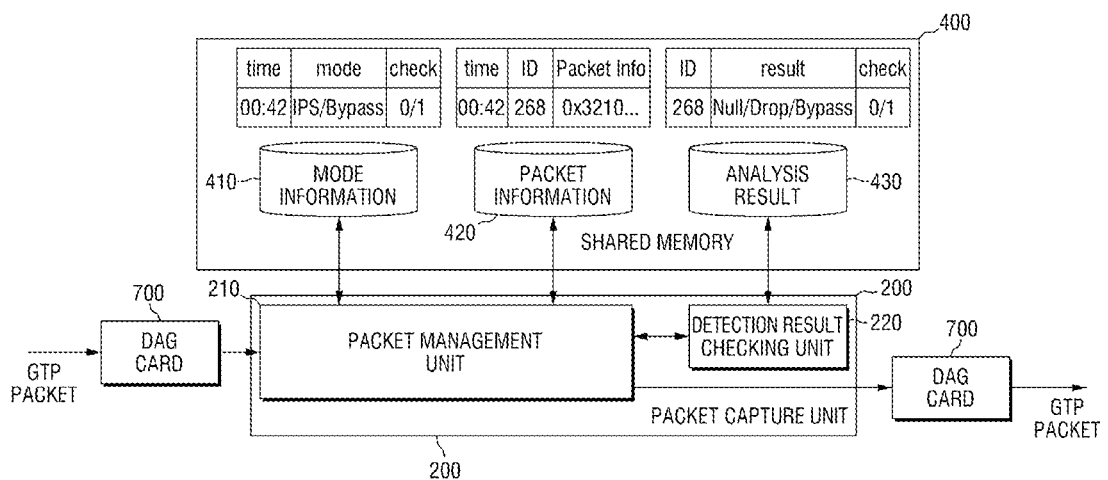
FIG. 7 is a schematic diagram illustrating the operation of a packet capture unit according to an embodiment of the present invention.
Figure 8:
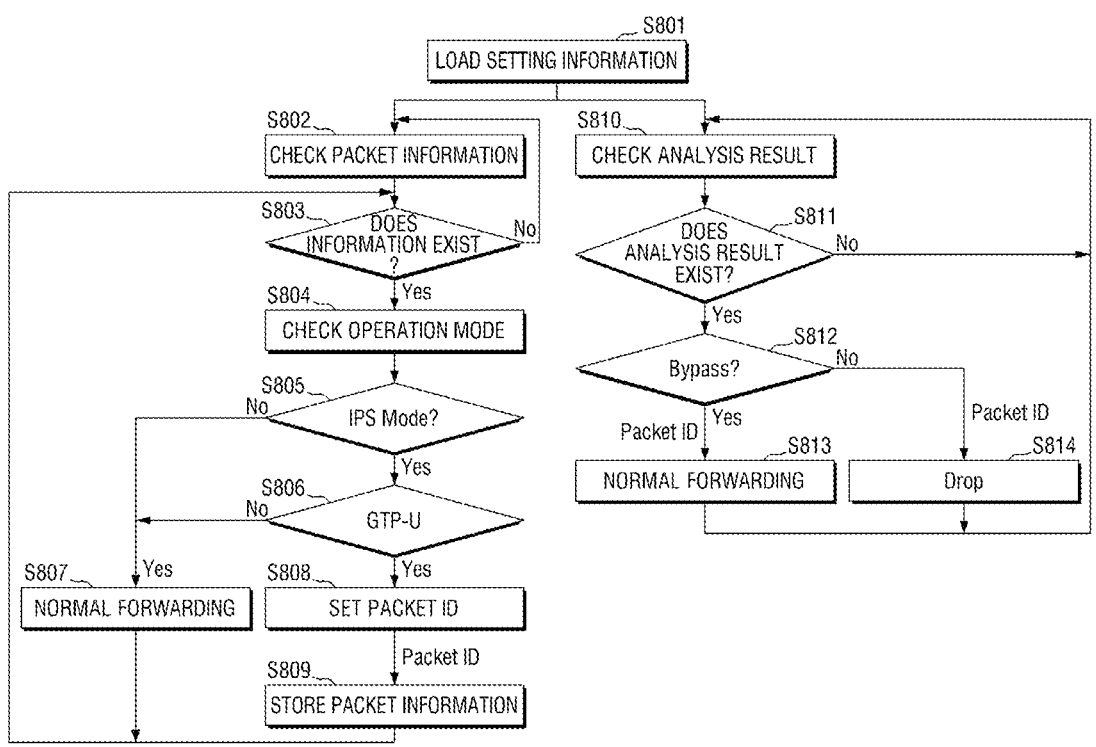
FIG. 8 is a flowchart illustrating the operation of the packet capture unit according to an embodiment of the present invention.

FIG. 7 is a schematic diagram illustrating the operation of the packet capture unit 200 according to an embodiment of the present invention. FIG. 8 is a flowchart illustrating the operation of the packet capture unit 200 according to an embodiment of the present invention.

Referring to FIG. 8, the packet capture unit 200 may load setting information, that is, information about the operation mode of a system (operation S801). As shown in FIG. 7, the packet management unit 210 may load a system operation mode stored in the mode information storage area 410 of the shared memory 400. As described above, when the operation mode of the system is changed, the check value of the mode information storage area 410 may be set to zero. However, when the packet management unit 210 loads a system operation mode, the check value may be set to one.

Next, the packet management unit 210 may check information about an input GTP packet (operation S802), check the operation mode of the system (operation S804) when information exists in the GTP packet (operation S803), and determine whether the operation mode of the system is the IPS mode (operation S805).

When the operation mode of the system is the bypass mode, the system transmits all input GTP packets without filtering them. Therefore, when the operation mode of the system is the bypass mode, the packet management unit 210 may forward the input GTP packet normally (operation S807).

When the operation mode of the system is the IPS mode, it should be analyzed whether the GTP packet is an abnormal GTP packet, and the GTP packet should be controlled based on the analysis result. Therefore, when the operation mode of the system is the IPS mode, it may be determined whether the GTP packet is a GTP-U packet (operation S806). As described above, a GTP-U packet that has another packet (such as GTP-C packet) encapsulated therein is defined as an abnormal GTP packet. Therefore, when the GTP packet is not the GTP-U packet, it can be forwarded normally (operation S807). However, when the GTP packet is the GTP-U packet, it should be determined whether the GTP packet is an abnormal GTP packet. Therefore, a packet ID may be set for the GTP packet (operation S808), and the packet ID and the information about the GTP packet may be stored in the shared memory 400 (operation S809). The time when the information about the GTP packet was uploaded, the packet ID, and the information about the GTP packet may be stored in the shared memory 400, specifically, in the packet information storage area 420 of the shared memory 400. A unique packet ID is assigned to each GTP packet, and a packet ID assigned to a GTP packet which has been determined to be normal or abnormal can be reused.

The detection result checking unit 220 checks analysis results stored in the shared memory 400 by the packet detection unit 300 (operation S810) and determines whether an analysis result of the GTP packet exists (operation S811). As described above, whether a GTP packet stored in the shared memory 400 has been analyzed and an analysis result of the GTP packet are recorded in the analysis result storage area 430 of the shared memory 400. When the analysis result of the GTP packet does not exist, that is, when the GTP packet has not yet been analyzed, the analysis result of the GTP packet is recorded as Null. Therefore, when the analysis result is Null, the analysis result of the GTP packet may be checked again. When the analysis result of the GTP packet exists, it may be determined whether the analysis result is Drop or Bypass (operation S812). When the analysis result is Bypass, the GTP packet is forwarded normally (operation S813). When the analysis result is not Bypass but Drop, the GTP packet may be dropped (operation S814).

Referring back to FIG. 1, the packet detection unit 300 may include a packet parsing unit 310 which parses information about a GTP packet and the packet analysis unit 320 which analyzes the parsed information about the GTP packet. In addition, referring to FIG. 2, the packet analysis unit 320 may include a detection policy management unit 321 which manages a detection policy.

As shown in FIG. 1, the packet parsing unit 310 may receive information about a GTP packet directly from the packet management unit 210 of the packet capture unit 200. Alternatively, as shown in FIG. 2, the packet management unit 210 may store the information about the GTP packet in the packet information storage area 420 of the shared memory 400, and the packet parsing unit 310 may access the packet information storage area 420 of the shared memory 400 and obtain the information about the GTP packet. In addition, as shown in FIG. 1, the packet analysis unit 320 may transmit an analysis result directly to the detection result checking unit 220 of the packet capture unit 200. Alternatively, as shown in FIG. 2, the packet analysis unit 320 may store the analysis result in the analysis result storage area 430 of the shared memory 400, and the detection result checking unit 220 may access the analysis result storage area 430 of the shared memory 400 and obtain information about the analysis result. The operation of the packet detection unit 300 which includes the packet parsing unit 310 and the packet analysis unit 320 will now be described in greater detail with reference to FIGS. 9 and 10.

Figure 9:
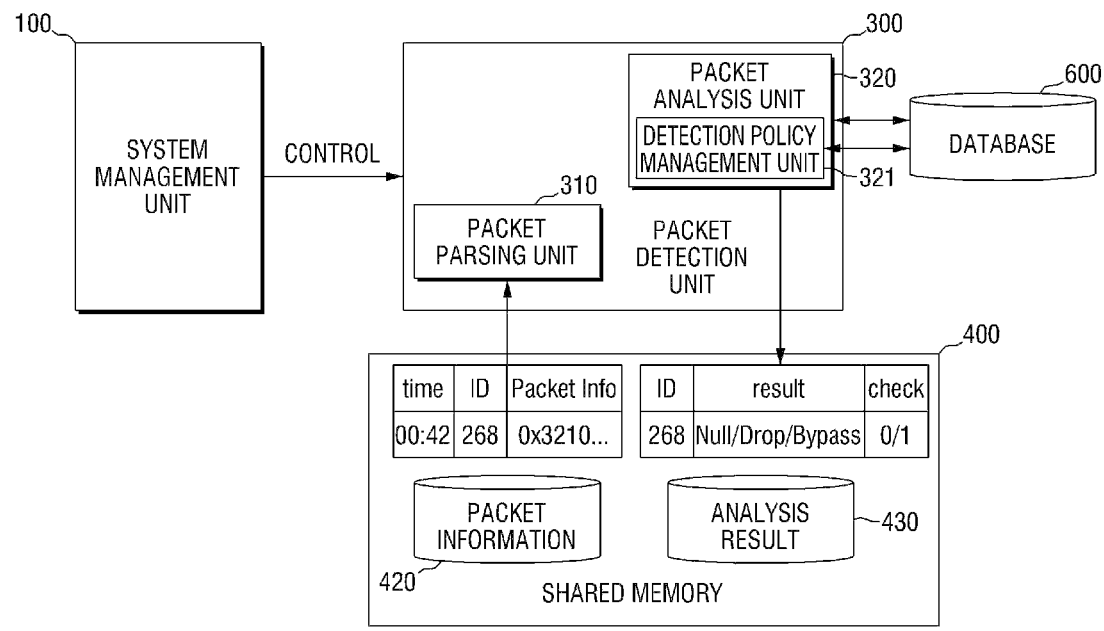
FIG. 9 is a schematic diagram illustrating the operation of a packet detection unit according to an embodiment of the present invention.
Figure 10:
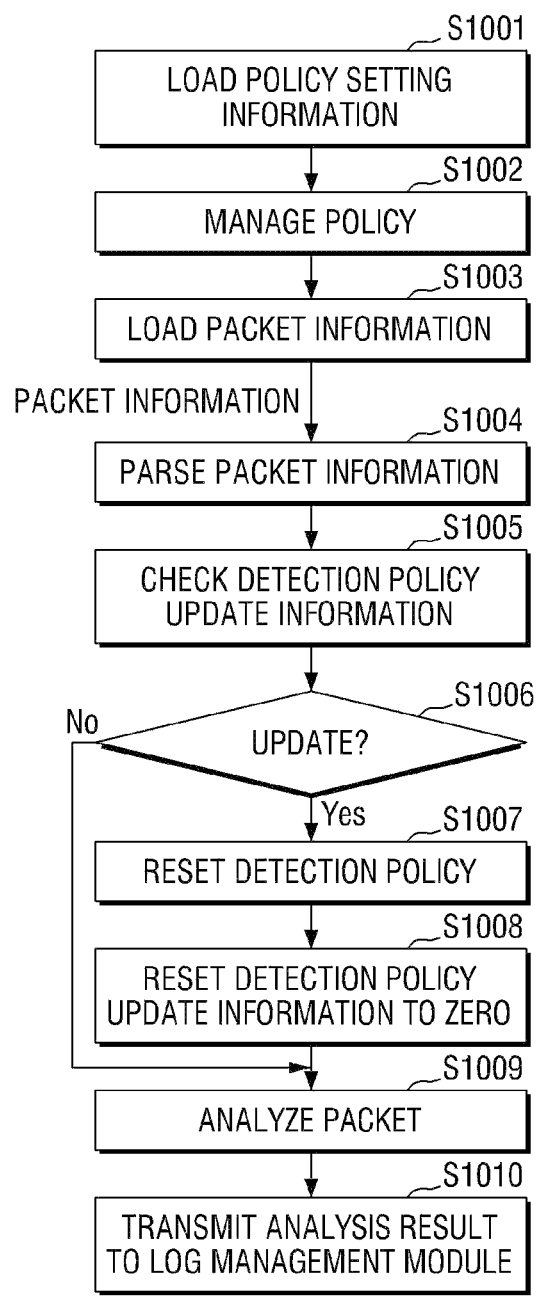
FIG. 10 is a flowchart illustrating the operation of the packet detection unit according to an embodiment of the present invention.

FIG. 9 is a schematic diagram illustrating the operation of the packet detection unit 300 according to an embodiment of the present invention. FIG. 10 is a flowchart illustrating the operation of the packet detection unit 300 according to an embodiment of the present invention.

Referring to FIG. 10, the packet detection unit 300 may load policy setting information (operation S1001). The packet detection unit 300 may load the policy the setting information from the database 600 using the detection policy management unit 321 included in the packet analysis unit 320. The policy setting information may include the intervals at which a detection policy is checked and information about an initial detection policy. The policy setting information may be stored in the database 600 or may be input by a user or administrator through the GUI 500.

The packet detection unit 300 may manage a detection policy (operation S1002). The packet detection unit 300 may manage the detection policy using the detection policy management unit 321 of the packet analysis unit 320. The operation of the detection policy management unit 321 will now be described in greater detail with reference to FIGS. 11 and 12.

Figure 12:
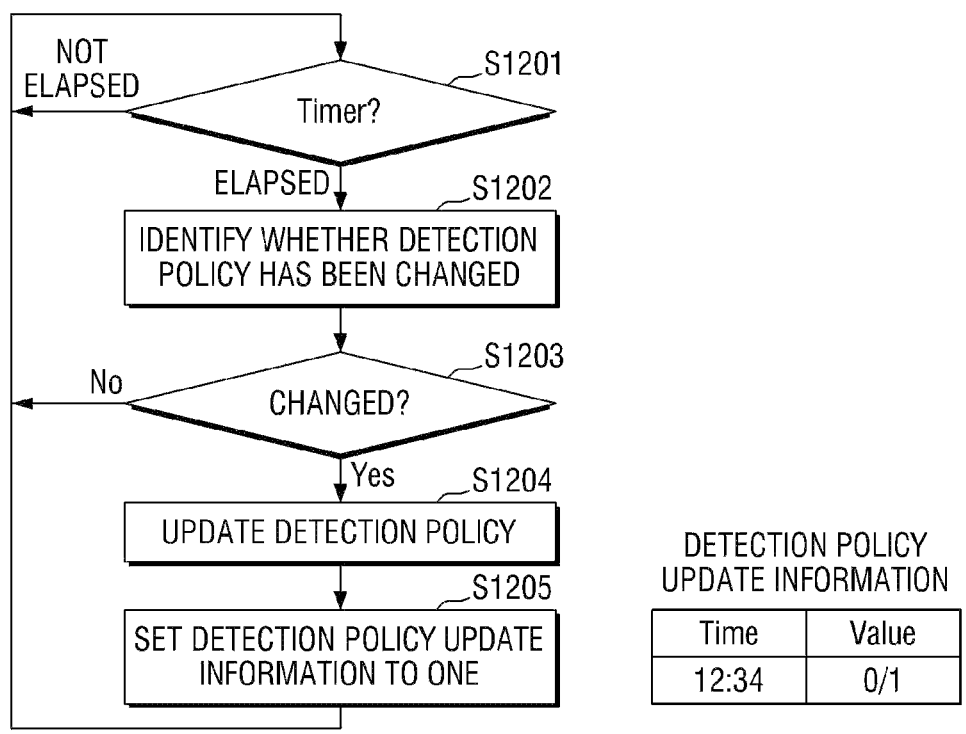
FIG. 12 is a flowchart illustrating the operation of a detection policy management unit according to an embodiment of the present invention.

FIG. 11 is a table of detection policies according to an embodiment of the present invention. FIG. 12 is a flowchart illustrating the operation of the detection policy management unit 321 according to an embodiment of the present invention.

A detection policy is a policy that defines how each abnormal GTP packet will be processed according to the type of the abnormal GTP packet. The detection policy may consist of a rule ID, a rule type, whether a GTP packet is an IP packet, whether the GTP packet is bound for a GTP-C port or a GTP-U port, a processing policy, and whether the detection policy is active. The detection policy may be configured in the form of a table as shown in FIG. 11.

Specifically, the rule ID is an ID used to identify each detection policy and may be set arbitrarily. In FIG. 11, an English alphabet in the rule ID is defined according to the rule type, and a number in the rule ID is defined for sub-classification of each rule type. However, it is obvious that the English alphabet and number in each rule ID can be defined in other ways.

The rule type is used to identify the type of an abnormal GTP packet, that is, the type of a GTP-in-GTP or GTP-over-GTP packet. The packet analysis unit 320 may determine whether an input GTP packet is an abnormal GTP packet and determine the type of the abnormal GTP packet to be PDP Create Req, PDP Update Req, PDP Delete Req, GTP Echo Req, or GTP-U. Determining whether an input GTP packet is an abnormal GTP packet will be described later. The rule type of the detection policy is used to identify the above-described types of abnormal GTP packets. However, it is obvious that the rule type can also be defined to identify other types of abnormal GTP packets.

The detection policy may include detailed criteria for subdividing each rule type. The detailed criteria may include whether a GTP packet is bound for an internal IP (i.e., whether the GTP packet is an IP packet) and a destination GTP port of the GTP packet. Specifically, the detailed criteria may include whether a GTP packet is bound for the internal IP, that is, whether the GTP packet is an IP packet. This is because even if the GTP packet is an abnormal GTP packet, when the GTP packet is not bound for the internal IP, it may not cause system malfunctions. The detailed criteria may further include the destination GTP port of the GTP packet. The destination GTP port can be a GTP-U port or a GTP-C port and can be changed according to the rule type. For example, when the rule type is PDP Create Req, PDP Update Req, or PDP Delete Req, it may be determined whether the destination GTP port is the GTP-C port. When the rule type is GTP Echo Req, it may be determined whether the destination GTP port is the GTP-C port or the GTP-U port. When the rule type is GTP-U, it may be determined whether the GTP port is the GTP-U port.

Each detection policy may include a processing policy on how a GTP packet corresponding to the detection policy identified by a rule ID will be processed. The processing policy includes Bypass and Drop. Bypass denotes that a GTP packet corresponding to a detection policy identified by a rule ID will not be dropped but be transmitted as it is. Drop denotes that a GTP packet corresponding to a detection policy identified by a rule ID will not be transmitted but be dropped within the system. When the system operates in the IPS mode, an abnormal GTP packet may be dropped. However, as described above, the abnormal GTP packet can also be transmitted without being dropped. In this case, the fact that the abnormal GTP packet existed may be recorded in the database 600.

Each detection policy may include information about whether the detection policy is active. When a detection policy is active, it may be determined whether a GTP packet corresponding to the detection policy exists. When the GTP packet corresponding to the detection policy exists, it may be processed according to the processing policy. When the detection policy is inactive, it may not be determined whether the GTP packet corresponding to the detection policy exists.

When the processing policy is Bypass, the GTP packet is transmitted in the same way as when the detection policy is inactive. Therefore, setting the processing policy to Bypass may be substantially the same as deactivating the detection policy. However, when the detection policy is active, the fact that such traffic actually exists may be recorded in the database 600.

Referring to FIG. 12, the detection policy management unit 321 may determine whether a timer has elapsed (operation S1201) and identify whether a detection policy has been changed only when the timer has elapsed (operation S1202). Whether the detection policy has been changed can be identified by periodically monitoring whether the database 600 has been updated. As described above with reference to FIG. 10, the time of the timer may be determined based on the intervals at which the detection policy included in the policy setting information loaded from the database 600 is checked. By checking whether the detection policy has been changed only when the timer has elapsed, the detection policy can be managed periodically.

When the detection policy has been changed (operation S1203), the detection policy management unit 321 may update the detection policy (operation S1204) and may set detection policy update information to one in order to inform the packet detection unit 300 of the update of the detection policy (operation S1205). The detection policy update information may include the time when the detection policy was updated and a value of one or zero indicating whether the detection policy has been updated.

Referring back to FIG. 10, the packet parsing unit 310 of the packet detection unit 300 may load packet information from the packet information storage area 420 of the shared memory 400 (operation S1003) and parse the packet information (operation S1004). The operation of the packet parsing unit 310 will now be described in greater detail with reference to FIG. 13.

Figure 13:
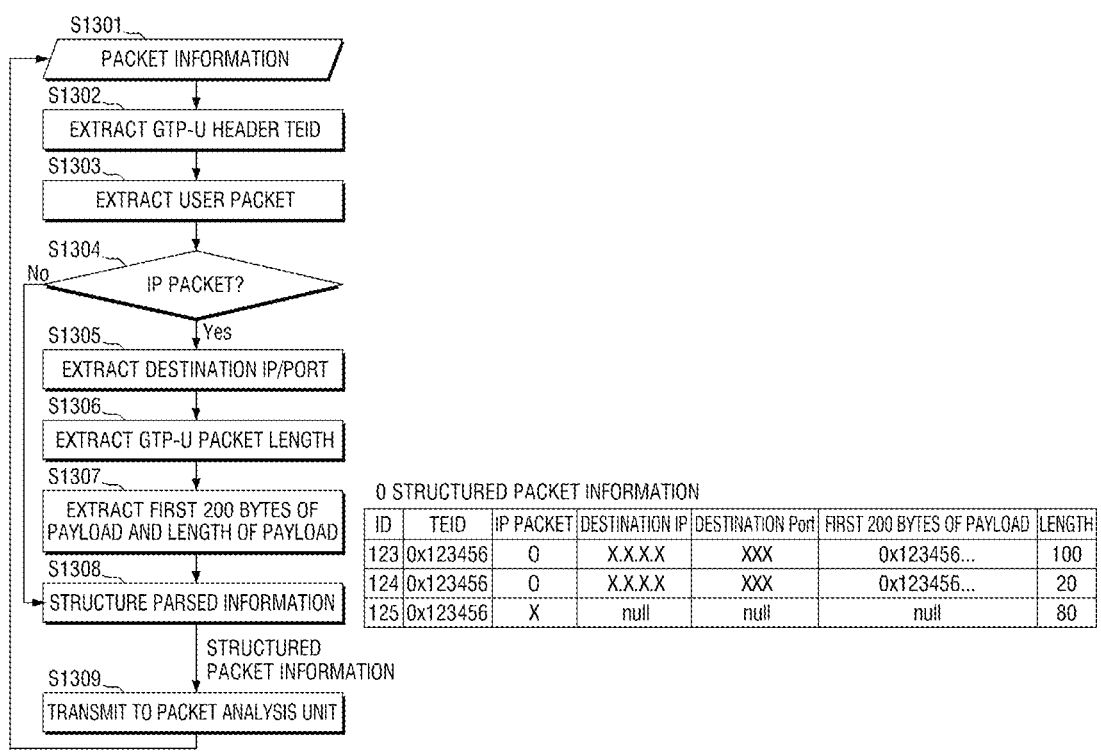
FIG. 13 is a flowchart illustrating the operation of a packet parsing unit according to an embodiment of the present invention.

FIG. 13 is a flowchart illustrating the operation of the packet parsing unit 310 according to an embodiment of the present invention. The packet parsing unit 310 may be a module which parses major information needed to analyze a GTP packet from the GTP packet before the packet analysis unit 320 analyzes the GTP packet. The packet parsing unit 310 may obtain information about a GTP packet stored in the shared memory 400, convert the obtained information into structured packet information, and transmit the structured packet information to the packet analysis unit 320.

Specifically, the packet parsing unit 310 may receive information about a GTP packet stored in the shared memory 400 (operation S1301) and extract an uplink tunneling endpoint identifier (TEID) of a GTP-U header (operation S1302) and a user packet (operation S1303). The packet parsing unit 310 may determine whether the extracted user packet is an IP packet, that is, whether the extracted user packet is bound for the internal IP (operation S1304). When the extracted user packet is not the IP packet, the packet parsing unit 310 may immediately structure the information about the GTP packet (operation S1308) and transmit the structured packet information to the packet analysis unit 320 (operation S1309). When the extracted user packet is the IP packet, the packet parsing unit 310 may extract a destination IP and a destination port (operation S1305), extract a length of a GTP-U packet (operation S1306), and extract first 200 bytes of a payload of the GTP-U packet and a length of the payload (operation S1307). Here, the length of the GTP-U packet may be extracted using information stored in the header of the GTP-U packet. In the present specification, a case where values of the first 200 bytes of the payload of the GTP-U packet are extracted is described as an embodiment. However, high-order byte values that are extracted are not limited to the values of the first 200 bytes of the payload but can be set flexibly to detect an abnormal GTP packet. The packet parsing unit 310 may form structured packet information as shown in FIG. 13 by structuring various extracted information and transmit the structured packet information to the packet analysis unit 320 (operation S1309).

Referring back to FIG. 10, the packet detection unit 300 may check the detection policy update information (operation S1005). As described above, when the detection policy is updated, the detection policy update information is set to one. Therefore, the packet detection unit 300 can identify whether the detection policy has been updated by checking the detection policy update information (operation S1006). When the detection policy has not been updated, a GTP packet may be analyzed based on the initial detection policy obtained when the policy setting information was loaded initially (operation S1009). When the detection policy has been updated, the detection policy may be reset to the updated detection policy (operation S1007), the detection policy update information may be set to zero (operation S1008), and the GTP packet may be analyzed based on the reset detection policy (operation S1009).

A process in which the packet analysis unit 320 of the packet detection unit 300 analyzes a GTP packet will now be described in greater detail with reference to FIGS. 14 through 20.

Figure 14:
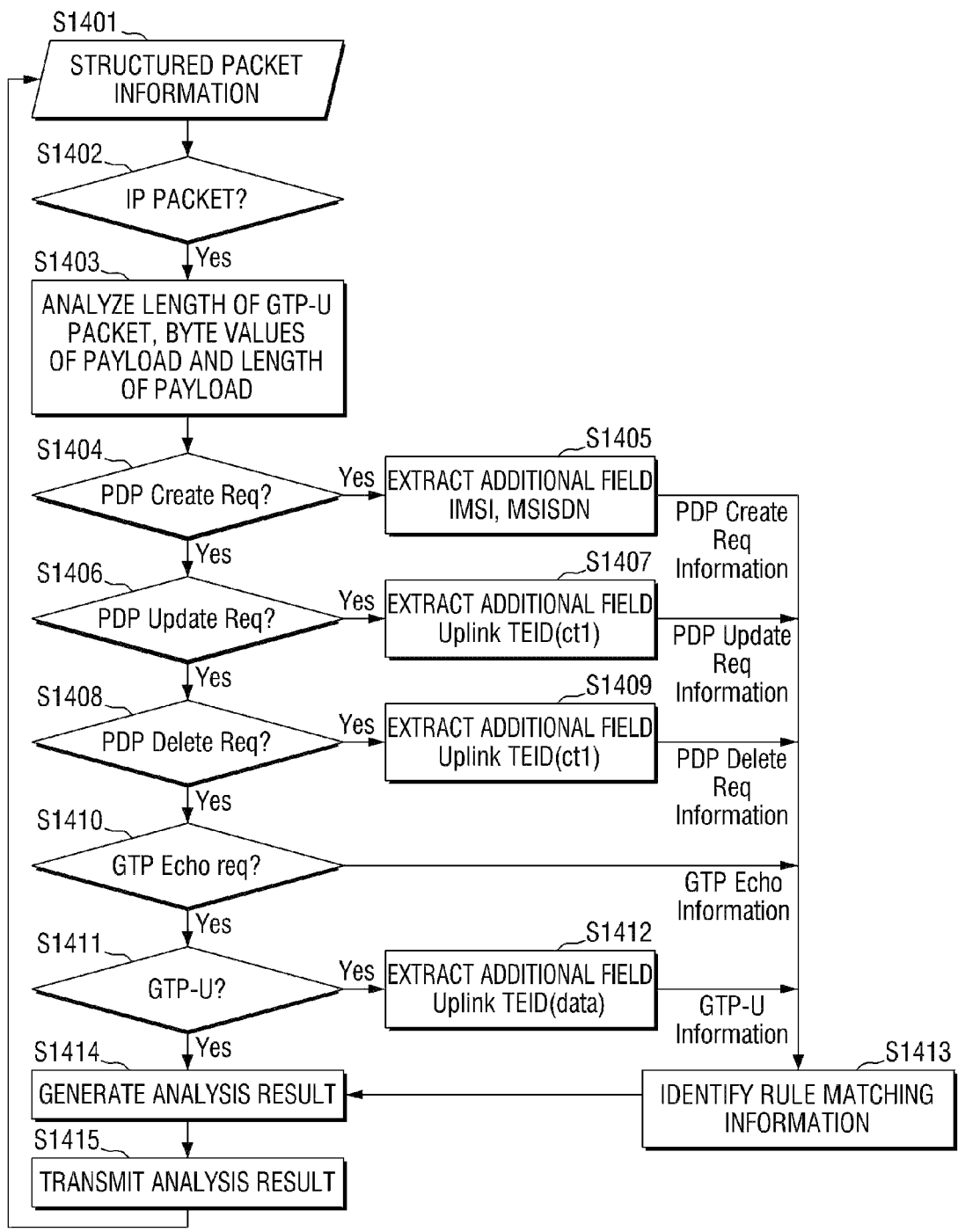
FIG. 14 is a flowchart illustrating the operation of a packet analysis unit according to an embodiment of the present invention.

FIG. 14 is a flowchart illustrating the operation of the packet analysis unit 320 according to an embodiment of the present invention. FIGS. 15 through 19 are flowcharts illustrating a process in which the packet analysis unit 320 determines whether a GTP packet is an abnormal GTP packet according to various embodiments of the present invention. FIG. 20 is a flowchart illustrating the operation of the packet analysis unit 320 according to an embodiment of the present invention.

Referring to FIG. 14, the packet analysis unit 320 may receive structured packet information about a GTP packet from the packet parsing unit 310 (operation S1401). Then, the packet analysis unit 320 may determine whether the GTP packet is an IP packet based on the structured packet information (operation S1402). When the GTP packet is not the IP packet, the packet analysis unit 320 may identify rule matching information from a detection policy (operation S1413). Identifying the rule matching information will be described later.

Next, the packet analysis unit 320 may analyze a length of a GTP-U packet, byte values of a payload of the GTP-U packet, and a length of the payload of the GTP-U packet (operation S1403). Specifically, the packet analysis unit 320 may determine whether the GTP packet is an abnormal GTP packet based on the length of the GTP-U packet, values of high-order bytes of the payload of the GTP-U packet, and the length of the payload. For example, the packet analysis unit 320 may determine whether the GTP packet is PDP Create Req (operation S1404), PDP Update Req (operation S1406), PDP Delete Req (operation S1408), GTP Echo Req (operation S1410), or GTP-U (operation S1411). In FIG. 14, whether the GTP packet is an abnormal GTP packet is determined in the order of PDP Create Req, PDP Update Req, PDP Delete Req, GTP Echo Req, and GTP-U. However, it is obvious that whether the GTP packet is any one of the above abnormal GTP packets can be determined in a different order from the above order or simultaneously.

Figure 15:
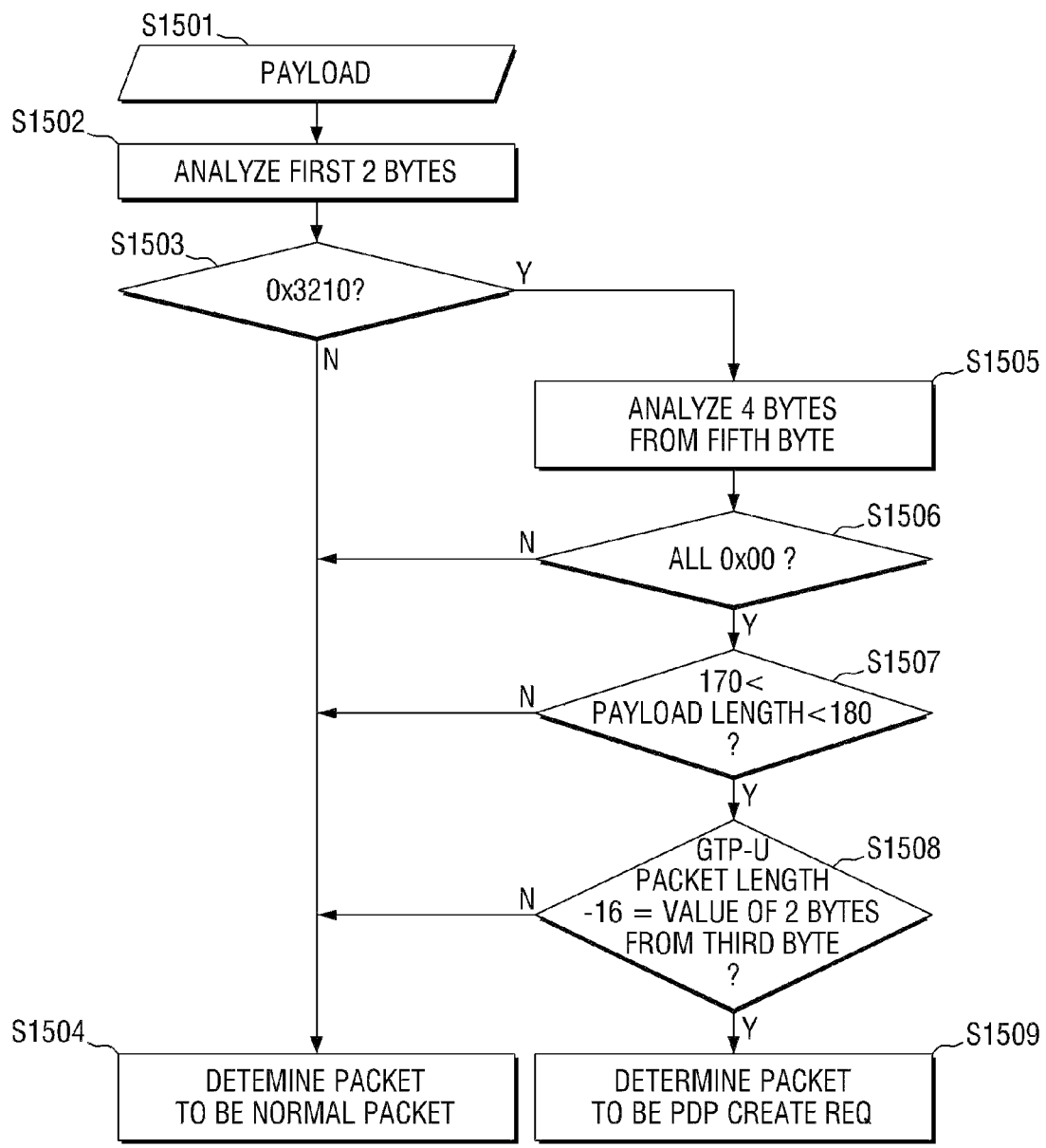
FIGS. 15 through 19 are flowcharts illustrating a process in which the packet analysis unit determines whether a GTP packet is an abnormal GTP packet according to various embodiments of the present invention.

Referring to FIG. 15, the packet analysis unit 320 may determine a GTP packet to be PDP Create Req among the abnormal GTP packets as follows.

The packet analysis unit 320 may receive a payload of a GTP-U packet (operation S1501), analyze first 2 bytes of the payload (operation S1502), and determine whether a value of the first 2 bytes is 0x3210 (operation S1503). When the value of the first 2 bytes is not 0x3210, the GTP packet may be detected as a normal packet (operation S1504).

When the value of the first 2 bytes is 0x3210, 4 bytes from (and including) a fifth byte of the payload of the GTP-U packet may be analyzed (operation S1505). After the 4 bytes from the fifth byte of the payload of the GTP-U packet are analyzed, it may be determined whether values of the 4 bytes from the fifth byte are all 0x00 (operation S1506). When the values of the 4 bytes from the fifth byte are all 0x00, it may determined whether a length of the payload of the GTP-U packet is greater than 170 and less than 180 (operation S1507). When the length of the payload is greater than 170 and less than 180, it may determined whether a difference between a length of the GTP-U packet and a value of 2 bytes from (and including) a third byte of the payload of the GTP-U packet is 16, that is, whether a value obtained by subtracting 16 from the length of the GTP-U packet is the value of the 2 bytes from the third byte of the payload of the GTP-U packet (operation S1508). When the difference between the length of the GTP-U packet and the value of the 2 bytes from the third byte of the payload of the GTP-U packet is 16, the GTP packet may be determined to be an abnormal GTP packet (i.e., PDP Create Req) (operation S1509).

When determining that the GTP packet is PDP Create Req, the packet analysis unit 320 may extract additional fields (IMSI, MSISDN) (operation S1405) and identify rule matching information (operation S1413).

Figure 16:
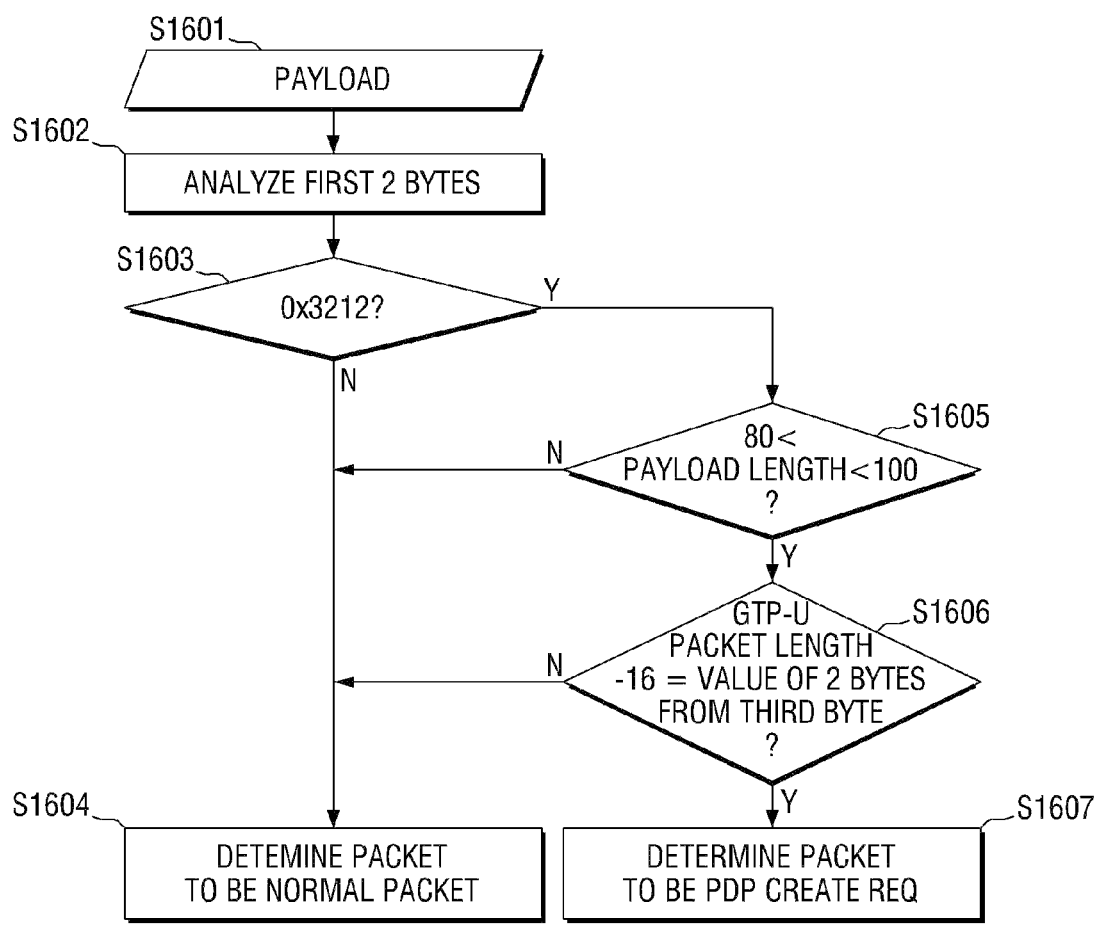

Referring to FIG. 16, the packet analysis unit 320 may determine a GTP packet to be PDP Update Req among the abnormal GTP packets as follows.

The packet analysis unit 320 may receive a payload of a GTP-U packet (operation S1601), analyze first 2 bytes of the payload (operation S1602), and determine whether a value of the first 2 bytes is 0x3212 (operation S1603). When the value of the first 2 bytes is not 0x3212, the GTP packet may be detected as a normal packet (operation S1604).

When the value of the first 2 bytes is 0x3212, it may be determined whether a length of the payload of the GTP-U packet is greater than 80 and less than 100 (operation S1605). When the length of the payload is greater than 80 and less than 100, it may determined whether a difference between a length of the GTP-U packet and a value of 2 bytes from (and including) a third byte of the payload of the GTP-U packet is 16, that is, whether a value obtained by subtracting 16 from the length of the GTP-U packet is the value of the 2 bytes from the third byte of the payload of the GTP-U packet (operation S1606). When the difference between the length of the GTP-U packet and the value of the 2 bytes from the third byte of the payload of the GTP-U packet is 16, the GTP packet may be determined to be an abnormal GTP packet (i.e., PDP Update Req) (operation S1607).

When determining that the GTP packet is PDP Update Req, the packet analysis unit 320 may extract an additional field (uplink TEID(Ct1)) (operation S1407) and identify rule matching information (operation S1413).

Figure 17:
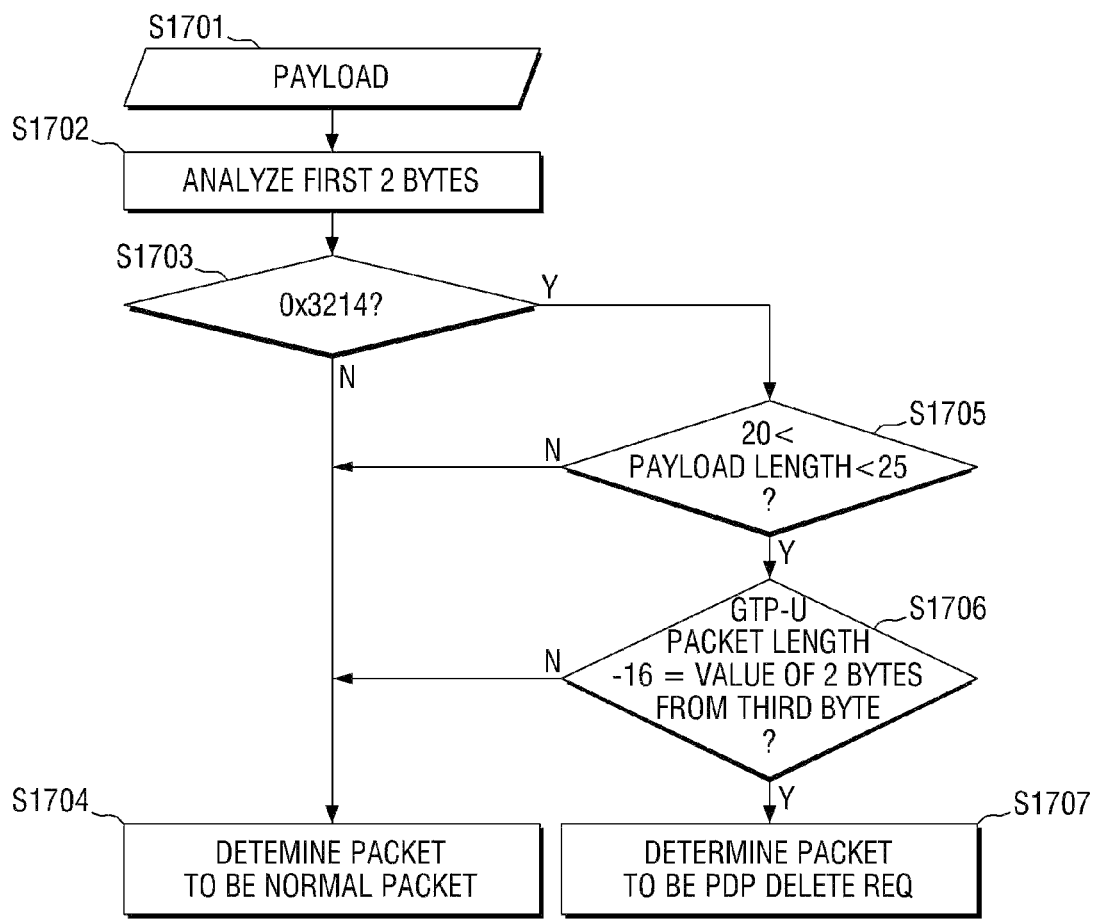

Referring to FIG. 17, the packet analysis unit 320 may determine a GTP packet to be PDP Delete Req among the abnormal GTP packets as follows.

The packet analysis unit 320 may receive a payload of a GTP-U packet (operation S1701), analyze first 2 bytes of the payload (operation S1702), and determine whether a value of the first 2 bytes is 0x3214 (operation S1703). When the value of the first 2 bytes is not 0x3214, the GTP packet may be detected as a normal packet (operation S1704).

When the value of the first 2 bytes is 0x3214, it may be determined whether a length of the payload of the GTP-U packet is greater than 20 and less than 25 (operation S1705). When the length of the payload is greater than 20 and less than 25, it may determined whether a difference between a length of the GTP-U packet and a value of 2 bytes from (and including) a third byte of the payload of the GTP-U packet is 16, that is, whether a value obtained by subtracting 16 from the length of the GTP-U packet is the value of the 2 bytes from the third byte of the payload of the GTP-U packet (operation S1706). When the difference between the length of the GTP-U packet and the value of the 2 bytes from the third byte of the payload of the GTP-U packet is 16, the GTP packet may be determined to be an abnormal GTP packet (i.e., PDP Delete Req) (operation S1707).

When determining that the GTP packet is PDP Delete Req, the packet analysis unit 320 may extract an additional field (uplink TEID(Ct1)) (operation S1409) and identify rule matching information (operation S1413).

Figure 18:
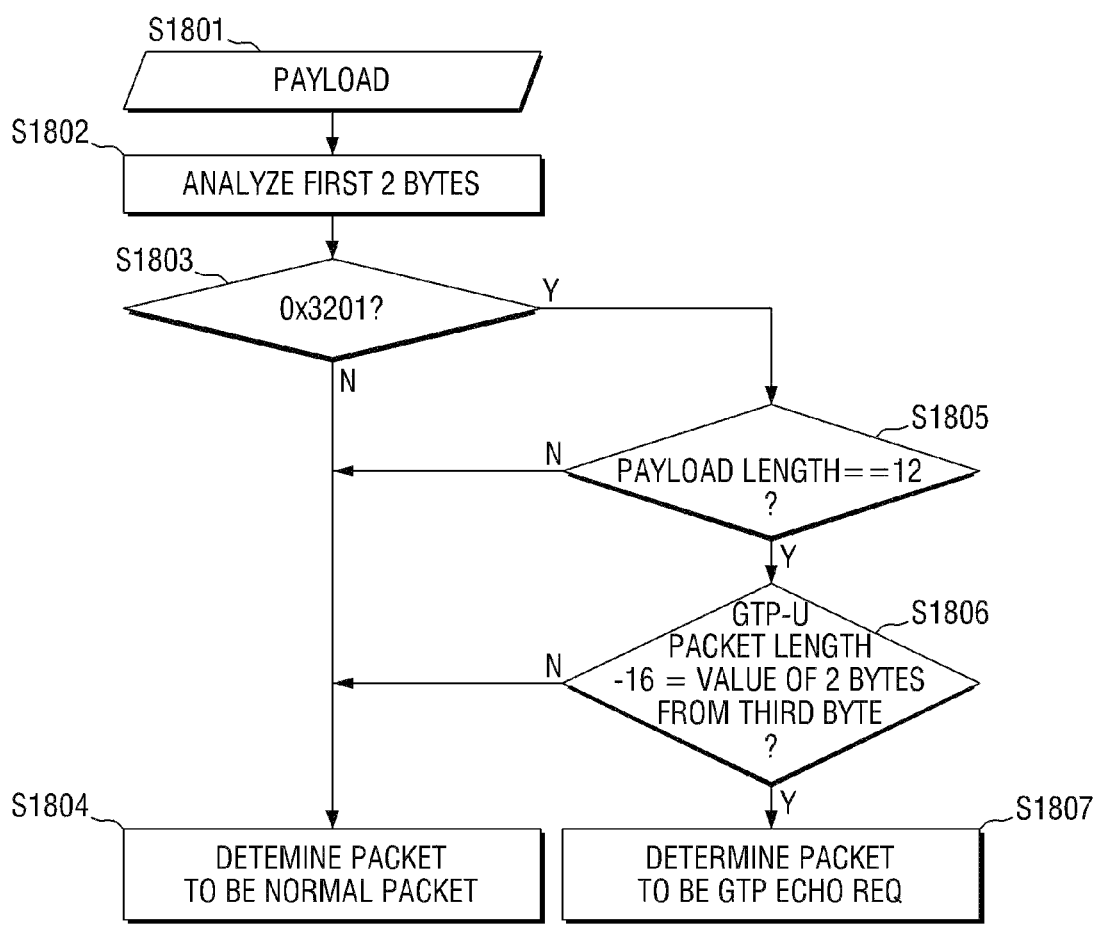

Referring to FIG. 18, the packet analysis unit 320 may determine a GTP packet to be GTP Echo Req among the abnormal GTP packets as follows.

The packet analysis unit 320 may receive a payload of a GTP-U packet (operation S1801), analyze first 2 bytes of the payload (operation S1802), and determine whether a value of the first 2 bytes is 0x3201 (operation S1803). When the value of the first 2 bytes is not 0x3201, the GTP packet may be detected as a normal packet (operation S1804).

When the value of the first 2 bytes is 0x3201, it may be determined whether a length of the payload of the GTP-U packet is 12 (operation S1805). When the length of the payload is 12, it may determined whether a difference between a length of the GTP-U packet and a value of 2 bytes from (and including) a third byte of the payload of the GTP-U packet is 16, that is, whether a value obtained by subtracting 16 from the length of the GTP-U packet is the value of the 2 bytes from the third byte of the payload of the GTP-U packet (operation S1806). When the difference between the length of the GTP-U packet and the value of the 2 bytes from the third byte of the payload of the GTP-U packet is 16, the GTP packet may be determined to be an abnormal GTP packet (i.e., GTP Echo Req) (operation S1807).

When determining that the GTP packet is GTP Echo Req, the packet analysis unit 320 may identify rule matching information (operation S1413).

Figure 19:
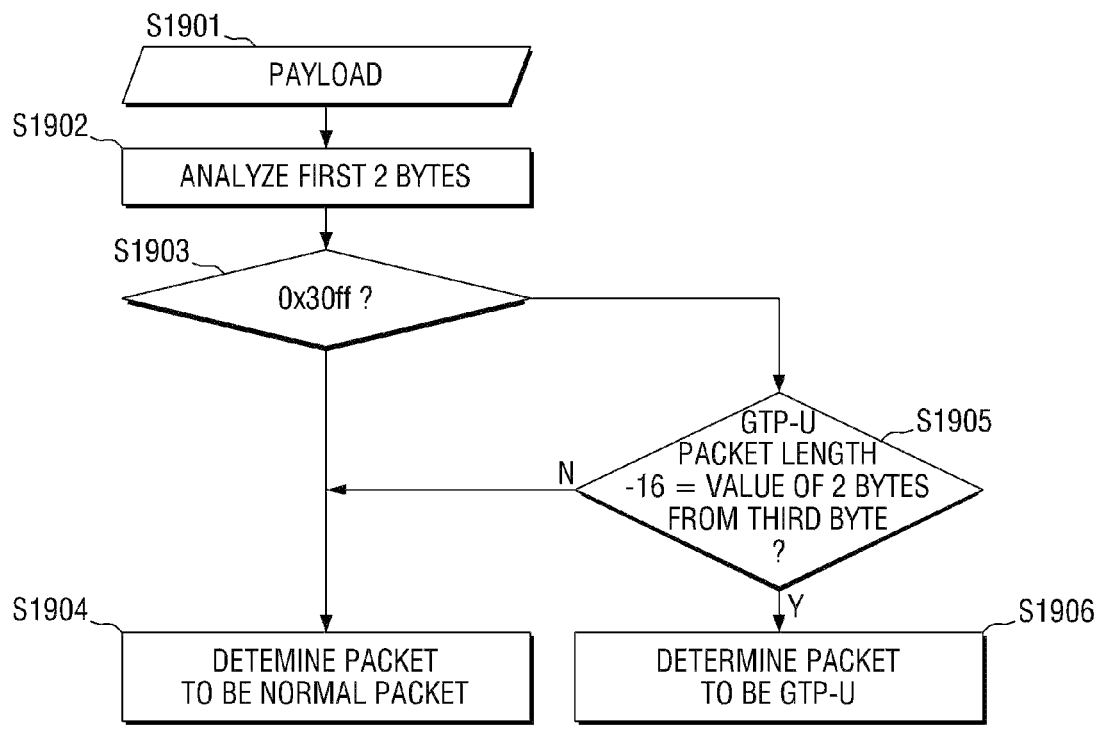
Figure 20:
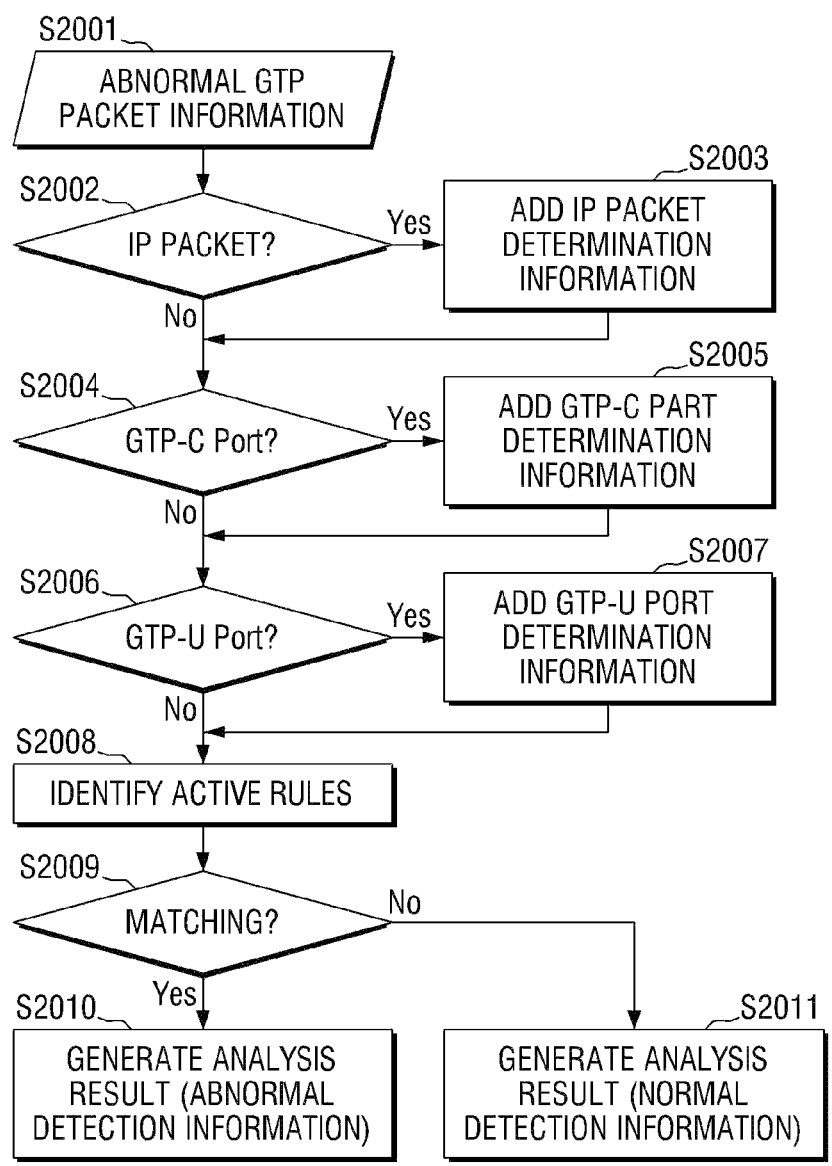
FIG. 20 is a flowchart illustrating the operation of the packet analysis unit according to an embodiment of the present invention.

Referring to FIG. 19, the packet analysis unit 320 may determine a GTP packet to be GTP-U Req among the abnormal GTP packets as follows.

The packet analysis unit 320 may receive a payload of a GTP-U packet (operation S1901), analyze first 2 bytes of the payload (operation S1902), and determine whether a value of the first 2 bytes is 0x30ff (operation S1903). When the value of the first 2 bytes is not 0x30ff, the GTP packet may be detected as a normal packet (operation S1904).

When the value of the first 2 bytes is 0x30ff, it may be determined whether a difference between a length of the GTP-U packet and a value of 2 bytes from (and including) a third byte of the payload of the GTP-U packet is 16, that is, whether a value obtained by subtracting 16 from the length of the GTP-U packet is the value of the 2 bytes from the third byte of the payload of the GTP-U packet (operation S1905). When the difference between the length of the GTP-U packet and the value of the 2 bytes from the third byte of the payload of the GTP-U packet is 16, the GTP packet may be determined to be an abnormal GTP packet (i.e., GTP-U Req) (operation S1906).

When determining that the GTP packet is GTP-U Req, the packet analysis unit 320 may extract an additional field (up-link TEID(data)) (operation S1412) and identify rule matching information (operation S1413).

A value (e.g., 0x3210 in FIG. 15 or 0x3212 in FIG. 16) compared with a value of first 2 bytes of a payload of a GTP-U packet may be set based on a GTP version. As described above, an abnormal GTP packet refers to a GTP-C or GTP-U packet encapsulated in a GTP-U packet, that is, a GTP packet encapsulated in another GTP packet. Therefore, the version of a GTP packet that can be encapsulated may determine the value compared with the value of the first 2 bytes of the payload of the GTP-U packet. Accordingly, the value compared with the value of the first 2 bytes of the payload may be set based on the version of the GTP packet.

In some embodiments, the value (e.g., 0x3210 in FIG. 15 or 0x3212 in FIG. 16) compared with the value of the first 2 bytes of the payload of the GTP-U packet may be set based at least partially on the GTP version. If the value (e.g., 0x3210 in FIG. 15 or 0x3212 in FIG. 16) compared with the value of the first 2 bytes of the payload of the GTP-U packet is set based at least partially on the GTP version, it means that the value compared with the value of the first 2 bytes of the payload is set based partially or entirely on the GTP version.

A value (e.g., 170 to 180 in FIG. 15 or 80 to 100 in FIG. 16) compared with a length of the payload of the GTP-U packet may be set based on an access point name (APN) field. The APN field may be included in a GTP-C packet. A different APN may be given to each mobile communication service provider, and the APN field may be changed accordingly. Since the length of the payload of the GTP-U packet can vary according to the APN field, the value compared with the length of the payload may be set based on the APN field.

In some embodiments, the value (e.g., 170 to 180 in FIG. 15 or 80 to 100 in FIG. 16) compared with the length of the payload of the GTP-U packet may be set based at least partially on the APN field. If the value (e.g., 170 to 180 in FIG. 15 or 80 to 100 in FIG. 16) compared with the length of the payload of the GTP-U packet is set based at least partially on the APN field, it means that the value compared with the length of the payload is set based entirely on the APN field or based on the APN field and other fields.

As described above, a length of the GTP-U packet may be a length of a GTP packet classified as a GTP-U packet. A value of 2 bytes from a third byte of the payload of the GTP-U packet, that is, a value of third and fourth bytes of the payload may be the length of the GTP-U packet.

Byte values and a payload length value used to determine whether a GTP packet is an abnormal packet in FIGS. 15 through 19 can vary flexibly according to an applied network or a communication service provider. For example, the byte values and the payload length value used to determine whether a GTP packet is an abnormal GTP packet may be different from the values used in FIGS. 15 through 19 and may be selected from a predetermined range. Further, the byte values and the payload length value used to determine whether a GTP packet is an abnormal GTP packet may be set variously based on the APN field as well as other omittable message fields.

When a GTP packet is none of PDP Create Req, PDP Update Req, PDP Delete Req, GTP Echo Req and GTP-U, it may be determined to be a normal packet, and an analysis result of the GTP packet may be generated (operation S1414). Then, the analysis result may be transmitted to the shared memory (operation S1415).

When the GTP packet is any one of PDP Create Req, PDP Update Req, PDP Delete Req, GTP Echo Req and GTP-U, rule matching information may be identified (operation S1413). Identifying rule matching information is a process of identifying whether an active detection policy matching a GTP packet exists. Identifying rule matching information will now be described in greater detail with reference to FIG. 20.

Referring to FIG. 20, the packet analysis unit 320 may determine whether an abnormal GTP packet is an IP packet based on information about the abnormal GTP packet (operation S2002). When determining that the GTP packet is the IP packet, the packet analysis unit 320 may add the determination result, that is, may store information indicating that the GTP packet is bound for the internal IP (operation S2003).

Next, the packet analysis unit 320 may determine whether a destination of the GTP packet is a GTP-C port (operation S2004). When determining that the destination of the GTP packet is the GTP-C port, the packet analysis unit 320 may add the determination result, that is, may store information indicating that the GTP packet is bound for the GTP-C port (operation S2005).

Next, the packet analysis unit 320 may determine whether the destination of the GTP packet is a GTP-U port (operation S2006). When determining that the destination of the GTP packet is the GTP-U port, the packet analysis unit 320 may add the determination result, that is, may store information indicating that the GTP packet is bound for the GTP-U port (operation S2005). For ease of description, the destination of the GTP packet is determined in the order of the GTP-C port and the GTP-U port. However, it is obvious that the destination of the GTP packet can also be determined in the order of the GTP-U port and the GTP-C port.

The packet analysis unit 320 may identify active rules (operation S2008). Specifically, the packet analysis unit 320 may identify active detection policies among a plurality of detection policies.

Then, the packet analysis unit 320 may identify whether any one of the active detection policies matches the GTP packet (operation S2009). When no active detection policy matches the GTP packet, the GTP packet may be detected as a normal packet, and an analysis result of the GTP packet may be generated as Bypass (operation S2010). When one of the active detection policies matches the GTP packet, the GTP packet may be detected as an abnormal GTP packet, and an analysis result of the GTP packet may be generated by determining whether to bypass or drop the GTP packet according to the matching detection policy (operation S2011).

Referring back to FIGS. 10 and 14, an analysis result may be generated by identifying rule matching information (operation S1414), and the generated analysis result may be transmitted to the shared memory 400 (operation S1415). In addition, the generated analysis result can be transmitted to a separate analysis result management module (operation S1010).

Figure 21:
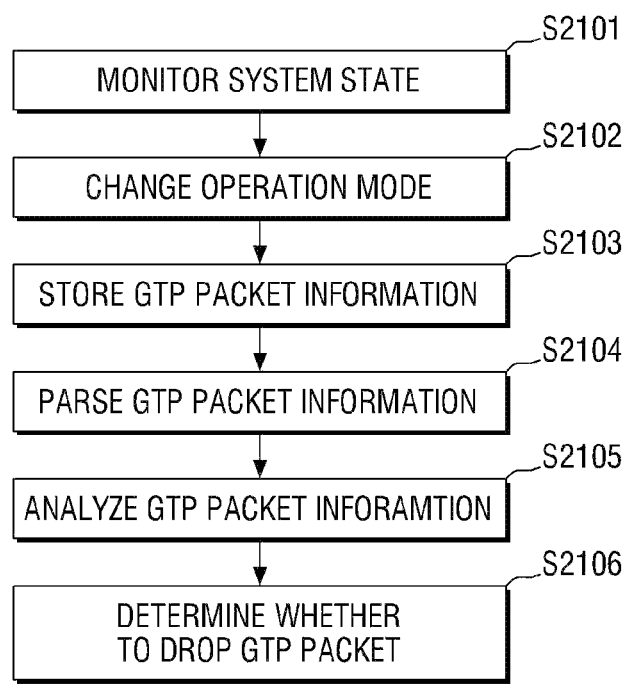
FIG. 21 is a flowchart illustrating a method of preventing the intrusion of an abnormal GTP packet according to an embodiment of the present invention.

FIG. 21 is a flowchart illustrating a method of preventing the intrusion of an abnormal GTP packet according to an embodiment of the present invention.

Referring to FIG. 21, the state of a system for preventing the intrusion of an abnormal GTP packet may be monitored (operation S2101). The operation of monitoring the state of the system is substantially the same as that described above with reference to FIGS. 4 through 6, and thus a repetitive description thereof will be omitted.

An operation mode of the system may be changed based on the monitored state of the system (operation S2102). The operation of changing the operation mode of the system based on the state of the system is substantially the same as that described above with reference to FIGS. 4 through 6, and thus a repetitive description thereof will be omitted.

Information about a GTP packet may be stored based on the operation mode of the system (operation S2103). The operation of storing the information about the GTP packet in a shared memory based on the operation mode of the system is substantially the same as that described above with reference to FIGS. 7 and 8, and thus a repetitive description thereof will be omitted.

The information about the GTP packet may be parsed (operation S2104). The operation of parting the information about the GTP packet is substantially the same as that described above with reference to FIGS. 9 through 20, and thus a repetitive description thereof will be omitted.

The information about the GTP packet may be analyzed (operation S2105). The operation of analyzing the information about the GTP packet, that is, the operation of parsing the GTP packet, structuring the parsed GTP packet, and analyzing information about the structured GTP packet is substantially the same as that described above with reference to FIGS. 9 through 20, and thus a repetitive description thereof will be omitted.

Finally, it may be determined whether to drop the GTP packet (operation S2106). The operation of determining whether to drop the GTP packet is substantially the same as that described above with reference to FIGS. 4 through 6 and 9 through 20, and thus a repetitive description thereof will be omitted.

Embodiments of the present invention provide at least one of the following advantages.

Generally, an abnormal GTP packet such as a GTP-in-GTP packet in which a GTP-C packet or a GTP-U packet is encapsulated in a GTP-U packet cannot be generated. Therefore, there has been no consideration given to a technology for detecting such an abnormal GTP packet. However, a system and method for preventing the intrusion of an abnormal GTP packet according to the present invention can efficiently detect such an abnormal GTP packet.

In the system and method for preventing the intrusion of an abnormal GTP packet according to the present invention, an abnormal GTP packet is detected based on a length of a GTP-U packet as well as byte values of a payload of the GTP-U packet and a length of the payload. Therefore, the system and method for preventing the intrusion of an abnormal GTP packet can be employed to detect abnormal GTP packets more accurately by reducing a detection error rate.

Repeated abnormal data call settings through abnormal GTP packets can cause the depletion of IP resources of a mobile communication network, leading to fatal results such as the disruption of the mobile Internet service. However, the system and method for preventing the intrusion of an abnormal GTP packet according to the present invention can prevent these problems.

However, the effects of the present invention are not restricted to the one set forth herein. The above and other effects of the present invention will become more apparent to one of daily skill in the art to which the present invention pertains by referencing the claims.

In combination with the embodiments herein, steps of the method or algorithm described may be directly implemented using hardware, a software module executed by a processor, or the combination thereof. The software module may be placed in a random access memory (RAM), a flash memory, a read-only memory (ROM), an electrically programmable ROM (EPROM), an electrically erasable programmable ROM (EEPROM), a register, a hard disk, a removable disk, a CD-ROM, or any storage medium of other forms well-known in the technical field. A storage medium is coupled to a processor so that the processor can read or write information from or into the storage medium. Alternatively, the storage medium may be integrated in the processor. The storage medium and the processor may be provided inside an application specific integrated circuit (ASIC). The ASIC may be provided inside user equipment. Alternatively, the storage medium and the processor may be provided as discrete components inside the user equipment.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A system for preventing the intrusion of an abnormal GPRS tunneling protocol (GTP) packet, the system comprising:
   a system management unit comprising a monitoring unit which monitors a state of the system and a mode changing unit which changes an operation mode of the system based on the state of the system;
   a packet capture unit comprising a packet management unit which stores information about a GTP packet based on the operation mode of the system and a detection result checking unit which determines whether to drop the GTP packet; and
   a packet detection unit comprising a packet parsing unit which parses the information about the GTP packet and a packet analysis unit which analyzes the parsed information about the GTP packet, wherein the operation mode of the system comprises an intrusion prevention system (IPS) mode or a bypass mode.

2. The system of claim 1, further comprising a shared memory used by the packet capture unit, the system management unit, and the packet detection unit to communicate with each other, wherein the shared memory stores information about the operation mode of the system, the information about the GTP packet, and an analysis result of the packet analysis unit.

3. The system of claim 2, wherein the monitoring unit determines that the system is in a failure state when the number of GTP packets unanalyzed by the packet analysis unit among GTP packets stored by the packet management unit is equal to or greater than a threshold value.

4. The system of claim 2, wherein the monitoring unit identifies whether the packet detection unit is operating by periodically checking a process status (PS) command and determines that the system is in the failure state when the packet detection unit is malfunctioning.

5. The system of claim 2, wherein the monitoring unit calculates a traffic input/output error by periodically checking inbound traffic and outbound traffic of the system and determines that the system is in the failure state when the traffic input/output error is equal to or greater than a threshold value, wherein the traffic input/output error is a value obtained by subtracting the amount of the outbound traffic and the number of GTP packets determined to be dropped by the detection result checking unit from the amount of the inbound traffic.

6. The system of claim 2, wherein the packet capture unit further comprises a receiving unit which receives a GTP packet from a serving GPRS support node (SGSN) and a transmitting unit which transmits a GTP packet to a gateway GPRS support node (GGSN).

7. The system of claim 6, wherein the packet management unit transmits the GTP packet received from the SGSN to the GGSN when the operation mode of the system stored in the shared memory is the bypass mode and stores information about the GTP packet received from the SGSN in the shared memory when the operation mode of the system stored in the shared memory is the IPS mode.

8. The system of claim 2, wherein the packet analysis unit comprises a detection policy management unit which manages a detection policy, wherein the detection policy is comprised of a rule ID, a rule type, whether a GTP packet is an IP packet, whether the GTP packet is bound for a GTP-C port or a GTP-U port, a processing policy, and whether the detection policy is active.

9. The system of claim 2, wherein the packet parsing unit loads the information about the GTP packet from the shared memory and structures the loaded information, wherein the structured information about the GTP packet comprises a packet ID, a GTP-U header tunnel endpoint identifier (TEID), whether the GTP packet is an IP packet, a destination port of the GTP packet, a length of a GTP-U packet, first 200 bytes of a payload of the GTP-U packet, and a length of the payload of the GTP-U packet.

10. The system of claim 9, wherein the packet analysis unit determines whether the GTP packet is an abnormal GTP packet based on the length of the GTP-U packet, byte values of the payload of the GTP-U packet, and the length of the payload of the GTP-U packet.

11. The system of claim 10, wherein when the GTP packet is an abnormal GTP packet, the packet analysis unit extracts an additional field, checks whether an active detection policy matching the GTP packet exists, and generates detection information, and the analysis result of the packet analysis unit comprises the detection information.

12. A method of preventing the intrusion of an abnormal GTP packet, the method comprising:
monitoring a state of a system for preventing the intrusion of an abnormal GTP packet;
changing an operation mode of the system based on the state of the system;
storing information about a GTP packet based on the operation mode of the system;
parsing the information about the GTP packet;
analyzing the parsed information about the GTP packet; and
determining whether to drop the GTP packet, wherein the operation mode of the system comprises an IPS mode or a bypass mode.

13. A method of detecting an abnormal GTP packet, the method comprising:
classifying a GTP packet as a GTP-U packet;
extracting a length of the GTP-U packet from the GTP-U packet;
extracting a payload of the GTP-U packet from the GTP-U packet and extracting byte values of the payload and a length of the payload; and
detecting an abnormal GTP packet based on the length of the GTP-U packet, the byte values of the payload, and the length of the payload;
wherein the detecting of the abnormal GTP packet comprises,
analyzing a value of first 2 bytes of the payload based on a first value;
comparing the length of the payload with a second value; and
comparing the length of the GTP-U packet with a value of 2 bytes from a third byte of the payload, wherein the first value is set based at least partially on a GTP version, and the second value is set based at least partially on an access point name (APN) field.

14. The method of claim 13, wherein the analyzing of the value of the first 2 bytes of the payload comprises analyzing 4 bytes from a fifth byte of the payload based on a third value which is set based at least partially on the GTP version, and the detecting of the abnormal GTP packet comprises detecting the GTP packet as the abnormal GTP packet when the first 2 bytes of the payload are 0x3210, when the 4 bytes from the fifth byte of the payload are all 0x00, when the length of the payload is greater than 170 and less than 180, and when a difference between the length of the GTP-U packet and the value of the 2 bytes from the third byte of the payload is 16.

15. The method of claim 13, wherein the detecting of the abnormal GTP packet comprises detecting the GTP packet as the abnormal GTP packet when the first 2 bytes of the payload are 0x3212, when the length of the payload is greater than 80 and less than 100, and when the difference between the length of the GTP-U packet and the value of the 2 bytes from the third byte of the payload is 16.

16. The method of claim 13, wherein the detecting of the abnormal GTP packet comprises detecting the GTP packet as the abnormal GTP packet when the first 2 bytes of the payload are 0x3214, when the length of the payload is greater than 20 and less than 25, and when the difference between the length of the GTP-U packet and the value of the 2 bytes from the third byte of the payload is 16.

17. The method of claim 13, wherein the detecting of the abnormal GTP packet comprises detecting the GTP packet as the abnormal GTP packet when the first 2 bytes of the payload are 0x3201, when the length of the payload is 12, and when the difference between the length of the GTP-U packet and the value of the 2 bytes from the third byte of the payload is 16.

18. The method of claim 13, wherein the detecting of the abnormal GTP packet comprises detecting the GTP packet as the abnormal GTP packet when the first 2 bytes of the payload are 0x30ff and when the difference between the length of the GTP-U packet and the value of the 2 bytes from the third byte of the payload is 16.

* * * * *